(12) United States Patent
Wolden et al.

(10) Patent No.: US 12,528,697 B1
(45) Date of Patent: Jan. 20, 2026

(54) GENERATION OF AMMONIA/HYDROGEN MIXTURES AND/OR HYDROGEN-ENRICHED FUEL MIXTURES

(71) Applicant: Colorado School of Mines, Golden, CO (US)

(72) Inventors: Colin A. Wolden, Denver, CO (US); Rok Sitar, Golden, CO (US); James Douglas Way, Boulder, CO (US)

(73) Assignee: Colorado School of Mines, Golden, CO (US)

( * ) Notice: Subject to any disclaimer, the term of this patent is extended or adjusted under 35 U.S.C. 154(b) by 291 days.

(21) Appl. No.: 18/097,228

(22) Filed: Jan. 14, 2023

Related U.S. Application Data

(63) Continuation of application No. PCT/US2023/010831, filed on Jan. 13, 2023.

(60) Provisional application No. 63/343,030, filed on May 17, 2022, provisional application No. 63/299,714, filed on Jan. 14, 2022.

(51) Int. Cl.
| | |
|---|---|
| *C01B 3/04* | (2006.01) |
| *B01J 19/24* | (2006.01) |
| *B01J 23/10* | (2006.01) |
| *B01J 23/46* | (2006.01) |
| *B01J 23/96* | (2006.01) |
| *B01J 37/02* | (2006.01) |
| *B01J 37/34* | (2006.01) |
| *B01J 38/48* | (2006.01) |
| *B01J 38/68* | (2006.01) |
| *C01B 3/26* | (2006.01) |
| *C01B 3/50* | (2006.01) |

(52) U.S. Cl.
CPC .......... *C01B 3/047* (2013.01); *B01J 19/2475* (2013.01); *B01J 23/10* (2013.01); *B01J 23/462* (2013.01); *B01J 23/96* (2013.01); *B01J 37/0205* (2013.01); *B01J 37/0228* (2013.01); *B01J 37/0236* (2013.01); *B01J 37/024* (2013.01); *B01J 37/343* (2013.01); *B01J 38/485* (2013.01); *B01J 38/68* (2013.01); *C01B 3/26* (2013.01); *C01B 3/505* (2013.01); *C01B 2203/0277* (2013.01); *C01B 2203/041* (2013.01); *C01B 2203/1064* (2013.01); *C01B 2203/1082* (2013.01)

(58) Field of Classification Search
CPC .......... C01B 3/047; C01B 3/26; C01B 3/505; C01B 2203/0277; C01B 2203/04661; C01B 2203/1064; C01B 2203/1082; C01B 2203/041; B01J 19/2475; B01J 23/10; B01J 23/462; B01J 23/96; B01J 37/0205; B01J 37/0228; B01J 37/0236; B01J 37/024; B01J 37/343; B01J 38/485; B01J 38/68
See application file for complete search history.

(56) References Cited

U.S. PATENT DOCUMENTS

| | | | |
|---|---|---|---|
| 11,090,628 B2 | 8/2021 | Way et al. | |
| 2014/0251131 A1 | 9/2014 | Way et al. | |
| 2019/0300366 A1* | 10/2019 | Mortensen | C01B 3/48 |
| 2020/0197889 A1* | 6/2020 | Jo | H01M 8/0606 |
| 2020/0269208 A1* | 8/2020 | Way | B01D 69/108 |

FOREIGN PATENT DOCUMENTS

| | | |
|---|---|---|
| KR | 10-2021-0119823 | 10/2021 |
| KR | 0119823 A * | 10/2021 |
| WO | WO 2023/137197 | 7/2023 |

OTHER PUBLICATIONS

Gallucci et.al. ("Recent advances on membranes and membrane reactors for hydrogen production", Chemical Engineering Science 92 (2013) 40-66). (Year: 2013).*
Zhang, Z.; "Design and Optimization Considerations of Advanced Catalytic Membrane Reactors for Efficient Ammonia Synthesis and Decomposition", Ph.D. thesis, 2021 (Year: 2021).*
KR20210119823a, English translation (Year: 2021).*
Zhang, et. al. ("Efficient Ammonia Decomposition in a Catalytic Membrane Reactor To Enable Hydrogen Storage and Utilization", ACS Sustainable Chem. Eng. 2019, 7, 5975-5985 (Year: 2019).*
U.S. Appl. No. 18/729,083, filed Jul. 15, 2024.
International Preliminary Report on Patentability for International (PCT) Patent Application No. PCT/US2023/010831, dated Jul. 25, 2024, 9 pages.
International Search Report and Written Opinion for International (PCT) Patent Application No. PCT/US2023/010831, dated Jun. 30, 2023, 24 pages.
Gallucci et al., "Recent advances on membranes and membrane reactors for hydrogen production," Chemical Engineering Science, vol. 92, Apr. 5, 2013, pp. 40-66.
Israni et al., "Hydrogen generation and purification in a composite Pd hollow fiber membrane reactor: Experiments and modeling," Catalysis Today, vol. 139, available online May 15, 2008, pp. 299-311.
Israni et al., "Methanol steam reforming in single-fiber packed bed Pd—Ag membrane reactor: Experiments and modeling," Journal of Membrane Science, vol. 369, available online Dec. 21, 2010, pp. 375-387.

(Continued)

*Primary Examiner* — Anthony J Zimmer
(74) *Attorney, Agent, or Firm* — Sheridan Ross P.C.

(57) ABSTRACT

Methods for the operation of membrane reactors (MRs) are disclosed for the efficient production of hydrogen-enriched fuel blends with tunable composition and high hydrogen recovery at both elevated and isobaric pressure operation. These methods enable use of greatly reduced operating temperatures relative to packed bed reactors (PBRs) and elimination of the need for a secondary separation unit operation. These methods provide greater productivity and hydrogen recovery while relaxing membrane selectivity constraints relative to conventional MR operation.

19 Claims, 19 Drawing Sheets

(56) References Cited

OTHER PUBLICATIONS

Jiang et al., "Novel hollow fiber membrane reactor for high purity H2 generation from thermal catalytic NH3 decomposition," Journal of Membrane Science, vol. 629, No. 119281, Jul. 1, 2021, 8 pages.

Park et al., "A catalytic composite membrane reactor system for hydrogen production from ammonia using steam as a sweep gas," Journal of Membrane Science, vol. 614, No. 118483, Nov. 15, 2020, 13 pages.

Sitar et al., "Compact ammonia reforming at low temperature using catalytic membrane reactors," Journal of Membrane Science, vol. 644, No. 120147, dated Feb. 15, 2022, 29 pages.

Sitar et al., "Efficient Generation of H2/NH3 Fuel Mixtures for Clean Combustion," Energy Fuels, vol. 36, No. 16, Aug. 9, 2022, pp. 9357-9364.

Zhang et al., "Efficient Ammonia Decomposition in a Catalytic Membrane Reactor to Enable Hydrogen Storage and Utilization," ACS Sustainable Chemical Engineering, vol. 7, No. 6, Feb. 27, 2019, pp. 5975-5985.

* cited by examiner

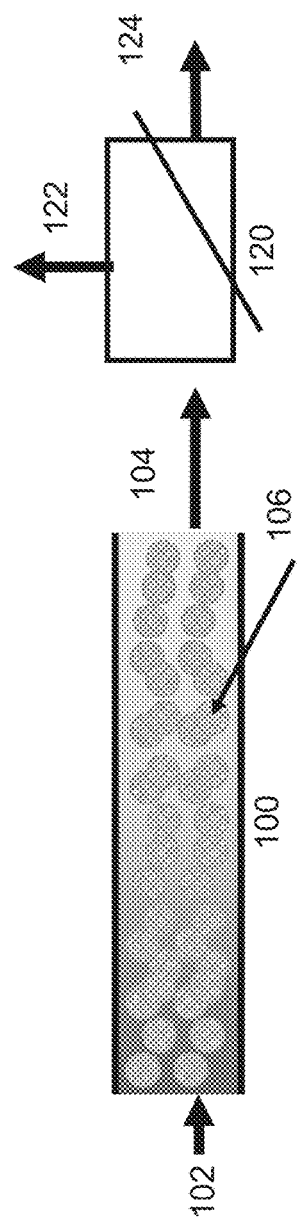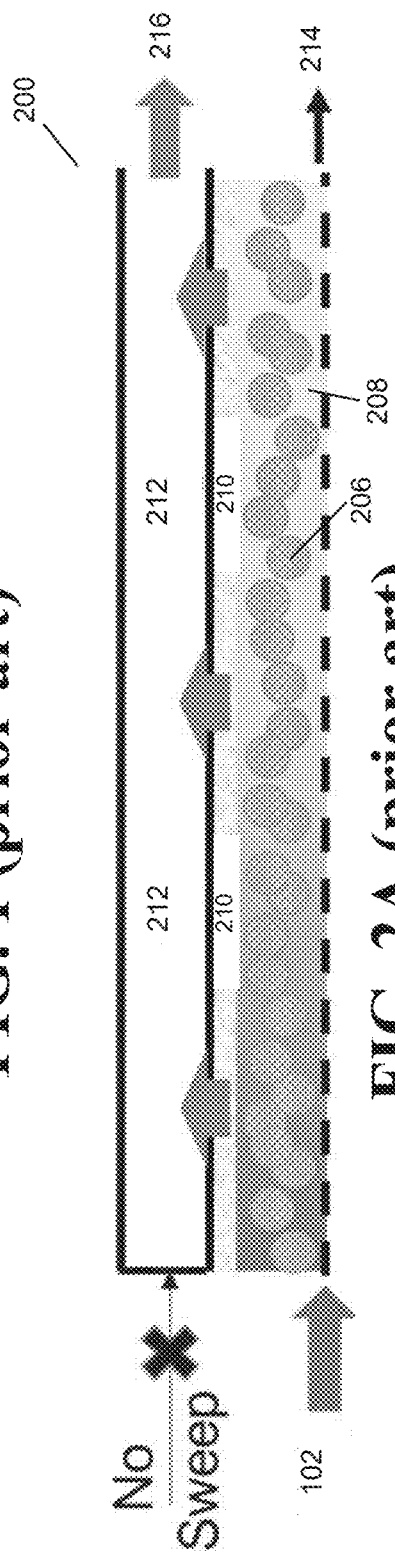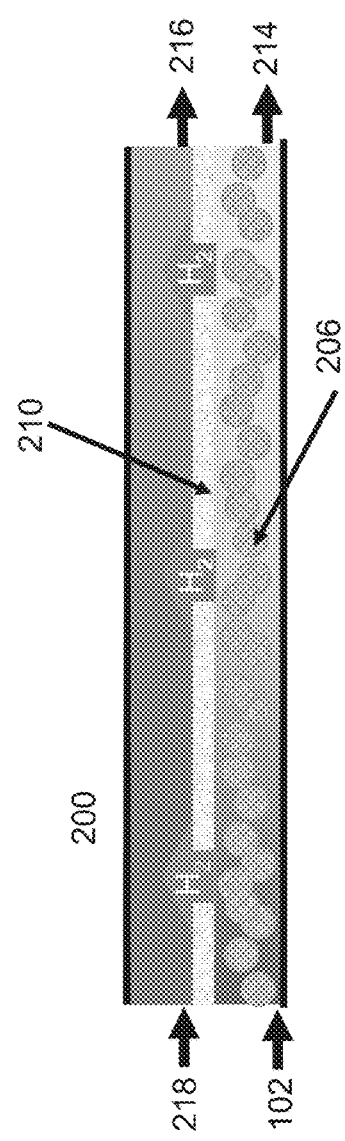
FIG. 1 (prior art)
FIG. 2A (prior art)
FIG. 2B

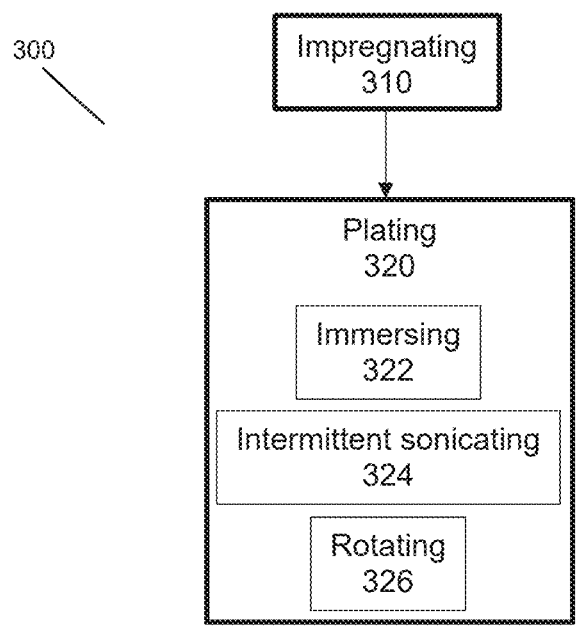
FIG. 3
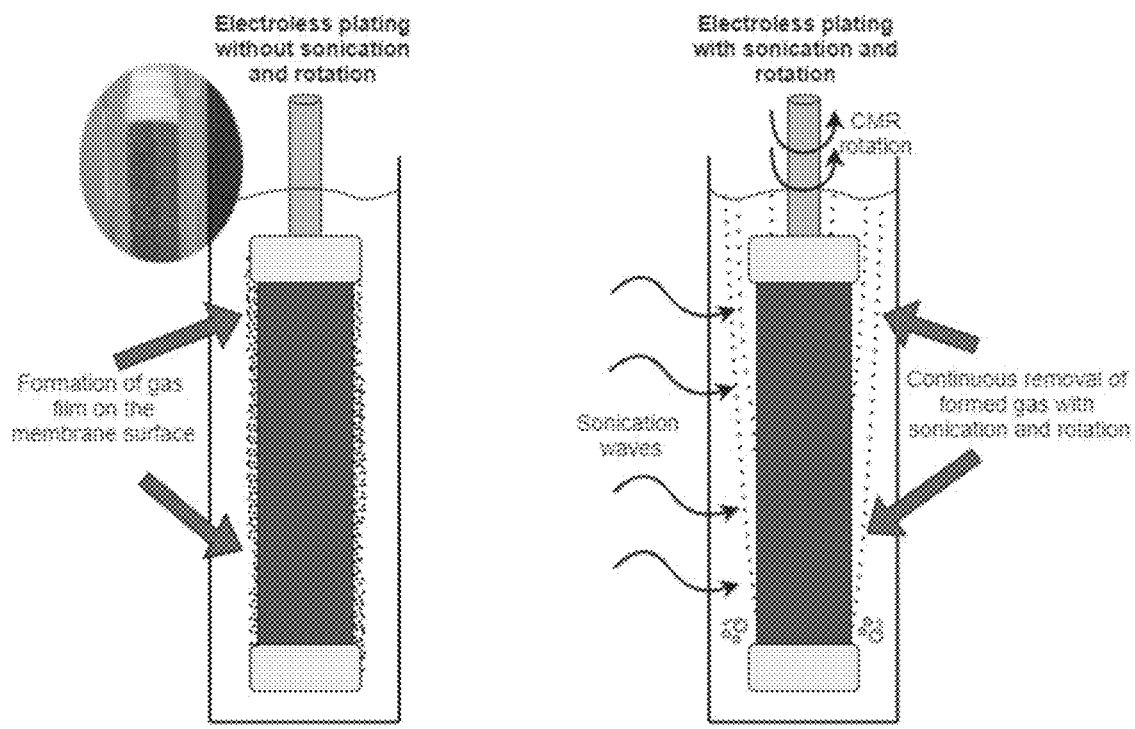
FIG. 4A  FIG. 4B

GENERATION OF AMMONIA/HYDROGEN MIXTURES AND/OR HYDROGEN-ENRICHED FUEL MIXTURES

CROSS-REFERENCE TO RELATED APPLICATIONS

This application is a continuation of PCT Application PCT/US2023/010831, filed 13 Jan. 2023 ("the '831 PCT application"). Both this application and the '831 PCT application claim the benefit of priority of U.S. Provisional Patent Applications 63/299,714, filed 14 Jan. 2022 ("the '714 provisional application"), and 63/343,030, filed 17 May 2022 ("the '030 provisional application"). The '831 PCT application, the '714 provisional application, and the '030 provisional application are incorporated herein by reference in their entireties.

STATEMENT REGARDING FEDERALLY SPONSORED RESEARCH

This invention was made with government support under grant number DE-AR0001004 awarded by the Advanced Research Projects Agency-Energy of the United States Department of Energy. The government has certain rights in the invention.

FIELD

The present disclosure relates to the catalytic decomposition of ammonia or other hydrogen-containing gases (e.g., methanol, ethanol, natural gas), the extraction of the released hydrogen gas through a selective membrane, and the collection of the released hydrogen gas by a fuel supplied as a sweep gas to form a hydrogen-enriched fuel mixture comprising ammonia, hydrocarbon(s), or mixtures thereof.

BACKGROUND

Hydrogen gas ($H_2$) has attracted great attention as a clean burning fuel. However, its practical implementation is limited by its very high costs of storage and distribution, as well as significant safety concerns. An alternative is to deliver hydrogen in the form of a chemical carrier (i.e., a compound comprising hydrogen) and producing the hydrogen on-site or on-board through reforming and purification. The majority of hydrogen is currently produced through reforming of carbon-based fuels (coal, natural gas, alcohols, CO, etc.) with steam. The hydrogen is then separated from the byproducts (e.g., CO, $CO_2$) using techniques such as pressure swing adsorption (PSA). To make this approach carbon neutral, the $CO_2$ must be captured for storage and/or utilization (CCUS). An alternative approach to achieve carbon neutrality is to use biofuels (e.g., bio-methanol, bio-ethanol, bio-formic acid).

Ammonia ($NH_3$) is a clean-burning, carbon-free fuel and has emerged as a leading vector for the storage and distribution of green hydrogen because it decomposes to hydrogen gas ($2NH_3 \rightarrow N_2 + 3 H_2$). The $N_2$ byproduct is relatively benign, and the reforming reaction is less energy intensive than hydrocarbon reforming. The flame speed of ammonia is very low, making it difficult to burn directly, while, conversely, pure hydrogen gas has an excessive flame speed that requires specialized combustion equipment. The partial decomposition of ammonia enables the creation of ammonia/hydrogen gas mixtures whose combustion properties can be tuned monotonically between these extremes. Particularly, $NH_3/H_2$ gas mixtures resulting from a 5-50% decomposition of ammonia have combustion properties similar to, and can be used as drop-in replacements for, hydrocarbons.

Conventionally, ammonia decomposition is carried out in large packed bed reactors (PBRs) at atmospheric pressure and temperatures of at least about 600° C., but the resulting product gas stream is diluted with nitrogen gas, which lowers the heating value of the product gas, decreases its flame speed, and can increase the formation of pollutants such as NOx during subsequent combustion of the resulting fuel. The nitrogen can be removed, but this requires an extra separation unit operation such as pressure swing adsorption (PSA). Additionally, it can be difficult to obtain high degrees of ammonia decomposition in these conventional PBRs without using a combination of extreme temperature and/or long residence times, such that the product gas stream may contain excessive unreacted ammonia in applications in which a large extent of ammonia decomposition (i.e., a low $NH_3$/high $H_2$ product gas) is desired.

Membrane reactors (MRs) are an alternative approach for hydrogen production from either hydrocarbon or ammonia reforming. In a MR, the decomposition reactions and $H_2$ separation are integrated into a single unit operation, which has two compartments separated by a hydrogen-selective membrane. The hydrogen-containing gas is supplied to the feed side and is decomposed over one or more appropriate catalysts. As hydrogen is released, it is continuously extracted through the hydrogen-selective membrane and is collected as a permeate stream. Unreacted species and byproducts of the decomposition depart the feed side through what is called the retentate stream. The most common configuration is a packed bed membrane reactor (PBMR), in which a packed bed of catalyst surrounds a membrane, as described, for example, in Sameer H. Israni and Michael P. Harold, "Methanol steam reforming in single-fiber packed bed Pd—Ag membrane reactor: experiments and modeling," 369 (1-2) *Journal of Membrane Science* 375 (March 2011); Sameer H. Israni et al., "Hydrogen generation and purification in a composite Pd hollow fiber membrane reactor: Experiments and modeling," 139 (4) *Catalysis Today* 299 (January 2009); and/or Ji Jiang et al., "Novel hollow fiber membrane reactor for high purity $H_2$ generation from thermal catalytic decomposition," 629 *Journal of Membrane Science* 119281 (July 2021). In a different configuration known as a catalytic membrane reactor (CMR), the catalyst is integrated with the membrane or membrane support, as described, for example, in Rok Sitar et al., "Compact ammonia reforming at low temperature using catalytic membrane reactors," 644 *Journal of Membrane Science* 120147 (February 2022) ("Sitar I," the entirety of which is incorporated herein by reference); Zhenyu Zhang et al., "Efficient ammonia decomposition in a catalytic membrane reactor to enable hydrogen storage and utilization," 7 (6) *ACS Sustainable Chemical Engineering* 5975 (February 2019) ("Zhang," the entirety of which is incorporated herein by reference); and/or Yongha Park et al., "A catalytic composite membrane reactor system for hydrogen production from ammonia using steam as a sweep gas," 614 *Journal of Membrane Science* 118483 (November 2020) ("Park"). Alternative configurations include fluidized bed membrane reactors (FBMR) or microreactors that promote better heat and/or mass transfer, as described, for example, in Fausto Gallucci et al., "Recent advances on membranes and membrane reactors for hydrogen production," 92 *Chemical Engineering Science* 40 (April 2013). Regardless of the specific configuration, all of these configurations share the same basic design and are collectively described herein as membrane reactors (MRs). Hydrogen-selective membranes include polymers, porous carbon, porous ceramics (zeolites, metal-organic frameworks (MOFs)), dense metals, and dense proton conducting ceramics. For these applications, palladium and its alloys are the most commonly used membrane materials, but this is merely one non-limiting example and those skilled in the art can choose additional or alternative membrane materials to suit a given application. Likewise, the catalysts are typically metals on ceramic supports, the choice of which depends on the specific reforming reaction; many embodiments utilize a ruthenium catalyst, but, again, this is merely one non-limiting example and those skilled in the art can choose additional or alternative catalysts to suit a given application.

In membrane reactors it is well known that the application of an unreactive sweep gas to the permeate side can enhance flux through the membrane by increasing the driving force and improving mass transfer. However, a sweep stream is typically not employed in the decomposition of ammonia to produce hydrogen, as the sweep gas dilutes the permeate stream, thus mandating an additional separation step. In the absence of a sweep stream the released hydrogen cannot be fully recovered and can only be enhanced with large pressure gradients across the membrane, which increases hydrogen flux but also the flux of undesired impurities (e.g., $NH_3$, $N_2$, CO), which in turn restricts membrane selectivity.

An exception is the work described in Park, whose authors used a steam sweep stream since it is useful to deliver humidified hydrogen for fuel cell application. The focus of this work is the generation of hydrogen-enriched fuel blends such as $H_2/NH_3$ or hydrogen-enriched natural gas (HENG) for use in conventional combustion applications such as process heaters, engines, generators, turbines, etc. These fuel blends mitigate or eliminate $CO_2$ emissions. These blends could be made by mixing the hydrogen produced from conventional techniques with the fuel of choice, but are generated more efficiently through the membrane reactor configuration described herein.

SUMMARY

The present disclosure describes the direct production of hydrogen enriched fuel mixtures in a membrane reactor by utilizing the second fuel as a sweep stream to enhance the recovery of hydrogen. This simple but novel modification offers significant benefits in terms of productivity, hydrogen recovery, high-pressure delivery, reduced operating temperature, composition control, and relaxes requirements on membrane selectivity. The methods and systems of the present disclosure utilize a membrane reactor (MR) to substantially completely decompose ammonia (or other hydrogen-containing gas) and extract the released hydrogen through a membrane into a permeate stream. The released hydrogen is then mixed with ammonia and/or one or more other gaseous fuels (e.g., natural gas, methane, propane, vaporized hydrocarbons, etc.) to create an ammonia/hydrogen and/or hydrogen/fuel blend. The properties of the ammonia/hydrogen and/or hydrogen fuel blend can, in view of the present disclosure, easily be tuned for a specific application; particularly, the carbon intensity of the blend can be reduced relative to a carbonaceous fuel with which the hydrogen gas is mixed. In addition, the gas mixtures may be delivered at elevated pressure without the need for expensive compression. The use of the sweep stream allows full hydrogen recovery under isobaric operation, which mitigates the migration of undesired impurities and relaxes constraints on membrane selectivity.

The methods and systems of the present disclosure may have any one or more of several advantages relative to the conventional packed bed reactor (PBR) plus separation methods and systems, and/or conventional methods and systems of operation of membrane reactors (MRs), currently known in the art. By way of first non-limiting example, the methods and systems of the present disclosure may enable the production of fuel gases with higher heating values and lower NOx formation capabilities than can be produced using conventional PBRs. By way of second non-limiting example, MRs according to the present disclosure may be capable of operating at lower temperatures and/or have reduced energy requirements relative to conventional PBRs. By way of third non-limiting example, MRs according to the present disclosure may have a smaller footprint and/or higher throughput than conventional PBRs. By way of fourth non-limiting example, the methods and systems of the present disclosure may offer the ability to deliver an ammonia/hydrogen and/or ammonia/fuel product stream at elevated pressure. By way of fifth non-limiting example, the methods and systems of the present disclosure enable rapid adjustment of the composition (e.g., relative concentrations of hydrogen vs. ammonia and/or hydrogen vs. fuel) and flowrate of the product gas stream. By way of sixth non-limiting example, the methods and systems of the present disclosure enable a method to recover up to 100%, and in many embodiments at least about 98%, of the hydrogen released upon decomposition of the hydrogen-containing gas. By way of seventh non-limiting example, the methods and systems of the present disclosure enable the use of membranes with reduced selectivity while maintaining comparable permeate purity.

The methods and systems of the present disclosure may further have any one or more of several advantages relative to methods and systems currently known in the art that utilize CMRs and/or packed bed membrane reactors (PBMRs). By way of first non-limiting example, the present disclosure describes advances in electroless plating procedures that enable reduction in the thickness of the membrane, improved uniformity of the membrane, and scale-up to commercial/industrial scales. By way of second non-limiting example, the present disclosure demonstrates the ability to recycle CMRs, recover the palladium from the membranes therefrom, and reuse the ceramic supports thereof. By way of third non-limiting example, the present disclosure describes the addition of catalyst to a lumen of the CMR, which improves the volumetric productivity of the CMR in the conversion-limited regime where performance is constrained by the ability of the catalyst to fully decompose ammonia. By way of fourth non-limiting example, the present disclosure describes improvements in membrane permeance, which improves the volumetric productivity of the CMR in the permeation-limited regime where ammonia is fully decomposed but the permeance of the membrane limits hydrogen recovery. By way of fifth non-limiting example, the present disclosure demonstrates for applications requiring a pure hydrogen stream the use of a naturally occurring zeolite clinoptilolite as an adsorbent capable of reducing ammonia in the permeate stream to the parts-per-billion levels required by proton-exchange membrane (PEM) fuel cells.

In an aspect of the present disclosure, a method for producing a hydrogen-enriched gaseous fuel comprises introducing a feed stream comprising ammonia (or any one or more other hydrogen-containing gases) into the feed side of a membrane reactor and supplying the gaseous fuel to be enriched as a sweep gas. The feed and sweep streams are separated by a hydrogen-selective membrane. The feed side of the membrane reactor comprises one or more catalysts for generation of hydrogen through decomposition of the hydrogen-containing gas, causing at least a portion of the hydrogen-containing gas in the feed stream to undergo a decomposition reaction to form a product gas stream comprising hydrogen gas. At least a portion of the hydrogen gas in the product gas stream is then passed through the hydrogen-selective membrane into the sweep stream to form a permeate gas stream comprising a mixture of the sweep gas and hydrogen gas, i.e., a stream of a gaseous fuel that is enriched with hydrogen, thereby leaving the unreacted carrier and non-hydrogen byproducts as a retentate gas stream.

In an aspect of the present disclosure, a method for producing a hydrogen-enriched fuel stream comprises introducing a feed stream comprising a hydrogen-containing gas into a feed portion of a membrane reactor, the feed portion containing a catalyst, wherein the hydrogen-containing gas is capable of catalytically decomposing to hydrogen gas; causing at least a portion of the hydrogen-containing gas in the feed stream to undergo a decomposition reaction to form a product gas stream comprising hydrogen gas, wherein the decomposition reaction is catalyzed by the catalyst; passing at least a portion of the hydrogen gas in the product gas stream across a hydrogen-selective membrane into a sweep portion of the membrane reactor, thereby leaving a remainder of the product gas stream in the feed portion as a retentate gas stream; and introducing a sweep gas stream, comprising a gaseous fuel, into the sweep portion to form a permeate gas stream comprising the gaseous fuel and the at least a portion of the hydrogen gas.

In embodiments, the gaseous fuel of the sweep gas stream may comprise ammonia and the hydrogen-enriched gas stream may comprise hydrogen gas and ammonia.

In embodiments, the gaseous fuel of the sweep gas stream may be selected from the group consisting of hydrocarbon fuels, natural gas, vaporized alcohols, vaporized hydrocarbons, carbon monoxide, and mixtures thereof.

In embodiments, the feed stream may comprise steam and at least one fuel selected from the group consisting of hydrocarbon fuels, vaporized biofuels, natural gas, vaporized alcohols, vaporized hydrocarbons, carbon monoxide, and mixtures thereof.

In embodiments, the membrane reactor may be selected from the group consisting of a packed bed membrane reactor, a catalytic membrane reactor, and a fluidized bed membrane reactor.

In embodiments, the hydrogen-selective membrane may comprise palladium.

In embodiments, the catalyst may comprise ruthenium.

In embodiments, the hydrogen-containing gas of the feed stream may be ammonia and the decomposition reaction may be carried out at a temperature of no more than about 450° C.

In embodiments, at least one of the following may be true: (i) a pressure of the feed stream and a pressure of the sweep gas stream are approximately equal; and (ii) a pressure of the retentate gas stream and a pressure of the permeate gas stream are approximately equal.

In embodiments, the at least a portion of the hydrogen gas may comprise at least about 98% of the hydrogen gas in the product gas stream.

In embodiments, an ideal $H_2/N_2$ selectivity of the hydrogen-selective membrane may be between about 10 and about 10,000.

In embodiments, the membrane reactor comprises a ceramic support material. The ceramic support material may comprise yttria-stabilized zirconia.

In embodiments, the hydrogen-selective membrane may comprise palladium and have a thickness of no more than about 5.0 μm.

In embodiments, an inner surface of an interior flow tube of the membrane reactor may be impregnated with the catalyst.

In embodiments, the method may further comprising adsorbing at least a portion of ammonia present in the permeate gas stream by an ammonia adsorbent contained within at least one of the sweep portion and an adsorption region in fluid communication with the sweep portion. In embodiments, the ammonia adsorbent may comprise clinoptilolite.

In an aspect of the present disclosure, a method for producing a hydrogen-enriched fuel stream comprises introducing a feed stream comprising ammonia into the feed side of a catalytic membrane reactor, causing at least a portion of the ammonia in the feed stream to undergo a decomposition reaction in an interior volume of the reactor to form a product gas stream comprising hydrogen gas, wherein the decomposition reaction is catalyzed by one or more metal catalysts; passing at least a portion of the hydrogen gas in the product gas stream through a hydrogen-selective membrane into an exterior volume to form a separated hydrogen gas stream, thereby leaving a remainder of the product gas stream in the interior volume as a retentate gas stream; flowing the retentate gas stream out of an exit of the interior volume; and passing a sweep gas comprising a fuel through the exterior volume to form a permeate stream comprising the hydrogen-enriched fuel.

In an aspect of the present disclosure, a method for producing a hydrogen-enriched fuel stream comprises introducing a feed stream comprising ammonia into an interior volume of a catalytic membrane reactor, wherein the catalytic membrane reactor comprises an interior flow tube, comprising an inner surface and an outer surface, wherein the outer surface is impregnated with a first metal catalyst and coated with a hydrogen-selective membrane; an exterior flow tube, comprising an inner surface and an outer surface; the interior volume, enclosed by the inner surface of the interior flow tube and containing particles of a second metal catalyst; and an exterior volume, enclosed between the outer surface of the interior flow tube and the inner surface of the exterior flow tube; causing at least a portion of the ammonia in the feed stream to undergo a decomposition reaction to form a product gas stream comprising hydrogen gas within the interior volume, wherein the decomposition reaction is catalyzed by the first and second metal catalysts; passing at least a portion of the hydrogen gas in the product gas stream through the hydrogen-selective membrane to form a separated hydrogen gas stream in the exterior volume, thereby leaving a remainder of the product gas stream in the interior volume as a retentate gas stream; flowing the retentate gas stream out of an exit of the interior volume; passing a sweep gas comprising a fuel into the exterior volume to form the hydrogen-enriched fuel stream; and flowing the hydrogen-enriched fuel stream out of an exit of the exterior volume.

In embodiments, at least one of the following may be true: (i) a pressure of the feed stream and a pressure of the sweep gas are approximately equal; and (ii) a pressure of the retentate stream and a pressure of the hydrogen-enriched fuel stream are approximately equal.

In embodiments, the at least a portion of the hydrogen gas may comprise at least about 98% of the hydrogen gas in the product gas stream.

In embodiments, an ideal $H_2/N_2$ selectivity of the hydrogen-selective membrane may be between about 10 and about 10,000.

In embodiments, the fuel of the sweep gas may be selected from the group consisting of ammonia, natural gas, methane, propane, butane, vaporized hydrocarbons, and combinations thereof.

In embodiments, a hydrogen content of the hydrogen-enriched fuel stream may be from about 1 vol % to about 99 vol %.

In embodiments, the decomposition reaction may be carried out at a temperature of no more than about 450° C. The temperature may be no more than about 400° C. The temperature may be no more than about 350° C. The temperature may be at least about 300° C.

In embodiments, the decomposition reaction may be carried out at atmospheric or superatmospheric pressure. The decomposition reaction may be carried out at a pressure from about 0 barg to about 5 barg. The decomposition reaction may be carried out at a pressure of at least about 5 barg.

In embodiments, at least one of the first and second metal catalysts may comprise ruthenium.

In embodiments, the interior flow tube may comprise a ceramic support material. The ceramic support material may comprise yttria-stabilized zirconia.

In embodiments, the second metal catalyst may comprise aluminum (III) oxide ($Al_2O_3$).

In embodiments, the hydrogen-selective membrane may comprise palladium. The palladium-containing hydrogen-selective membrane may have a thickness of no more than about 5.0 µm.

In embodiments, the inner surface of the interior flow tube may be impregnated with the first metal catalyst.

In an aspect of the present disclosure, a method for fabricating a catalytic membrane reactor comprises impregnating an outer surface of a ceramic support with a metal catalyst; and plating the outer surface of the ceramic support with a coating material via electroless deposition, wherein the plating step comprises immersing the ceramic support in a bath of a plating solution comprising the coating material; intermittently sonicating the bath; and rotating the ceramic support within the bath.

In embodiments, the impregnating step may comprise placing the ceramic support in a catalyst bath comprising the metal catalyst for a period of time sufficient to impregnate the outer surface of the ceramic support with the metal catalyst; removing the ceramic support from the catalyst bath; and drying the ceramic support. The impregnating step may, but need not, comprise reducing the ceramic support under an atmosphere of hydrogen gas.

In embodiments, the metal catalyst may be a ruthenium catalyst.

In an aspect of the present disclosure, a method for recycling a catalytic membrane reactor comprises removing a first palladium-containing membrane from an outer surface of a flow tube of a catalytic membrane reactor by dissolving palladium in the first palladium-containing membrane in an acid solution; and plating the outer surface of the flow tube with a second palladium-containing membrane via electroless deposition.

In embodiments, the plating step may comprise immersing the ceramic support in a bath of a plating solution comprising palladium; intermittently sonicating the bath; and rotating the ceramic support within the bath.

In embodiments, the acid solution may comprise hydrochloric acid and nitric acid.

In embodiments, the method may further comprise impregnating the outer surface of the ceramic support with a metal catalyst.

In embodiments, the method may further comprise recovering at least a portion of the palladium dissolved in the acid solution. The second palladium-containing membrane may, but need not, comprise at least a portion of the palladium recovered from the acid solution.

In an aspect of the present disclosure, a catalytic membrane reactor comprises a feed vessel, comprising a feed-facing surface and a permeate-facing surface, wherein the permeate-facing surface is impregnated with a first metal catalyst and coated with a hydrogen-selective membrane; a permeate vessel; a feed region, in contact with the feed-facing surface of the feed vessel and containing particles of a second metal catalyst; and a permeate region, in contact with the permeate-facing surface of the feed vessel.

In embodiments, at least one of the first and second metal catalysts may comprise ruthenium.

In embodiments, the feed vessel may comprise a ceramic support material. The ceramic support material may comprise yttria-stabilized zirconia.

In embodiments, the second metal catalyst may comprise aluminum (III) oxide ($Al_2O_3$).

In embodiments, the hydrogen-selective membrane may comprise palladium. The palladium-containing hydrogen-selective membrane may have a thickness of no more than about 5.0 µm.

In embodiments, the hydrogen-selective membrane may have an ideal $H_2/N_2$ selectivity of between about 10 and about 10,000.

In embodiments, the feed-facing surface of the feed vessel may be impregnated with the first metal catalyst.

In embodiments, the catalytic membrane reactor may further comprise an ammonia adsorbent contained within at least one of the permeate volume and an adsorption region in fluid communication with the permeate volume.

In embodiments, the ammonia adsorbent may comprise clinoptilolite.

While specific embodiments and applications have been illustrated and described, the present disclosure is not limited to the precise configuration and components described herein. Various modifications, changes, and variations which will be apparent to those skilled in the art may be made in the arrangement, operation, and details of the methods and systems disclosed herein without departing from the spirit and scope of the overall disclosure.

As used herein, unless otherwise specified, the terms "about," "approximately," etc., when used in relation to numerical limitations or ranges, mean that the recited limitation or range may vary by up to 10%. By way of non-limiting example, "about 750" can mean as little as 675 or as much as 825, or any value therebetween. When used in relation to ratios or relationships between two or more numerical limitations or ranges, the terms "about," "approximately," etc. mean that each of the limitations or ranges may vary by up to 10%; by way of non-limiting example, a statement that two quantities are "approximately equal" can mean that a ratio between the two quantities is as little as 0.9:1.1 or as much as 1.1:0.9 (or any value therebetween), and a statement that a four-way ratio is "about 5:3:1:1" can mean that the first number in the ratio can be any value of at least 4.5 and no more than 5.5, the second number in the ratio can be any value of at least 2.7 and no more than 3.3, and so on.

Except where expressly stated otherwise, all pressure values stated herein are absolute pressures.

The embodiments and configurations described herein are neither complete nor exhaustive. As will be appreciated, other embodiments are possible utilizing, alone or in combination, one or more of the features set forth above or described in detail below.

BRIEF DESCRIPTION OF THE DRAWINGS

FIG. 1 is a schematic of a conventional (i.e., prior art) process for hydrogen production by the reforming of a hydrogen-containing gas in a packed bed reactor (PBR), followed by purification of hydrogen in an additional separation unit.

FIG. 2A is a schematic of a conventional (i.e., prior art) process for hydrogen production in a membrane reactor (MR) without the use of a sweep gas.

FIG. 2B is a schematic of a process for the production of an $H_2$-enriched fuel mixture in an MR in which a secondary fuel is introduced as a sweep gas, according to embodiments of the present disclosure.

FIG. 3 is a flowchart of a method for fabricating a catalytic membrane reactor, according to embodiments of the present disclosure.

FIG. 4A is a schematic of a setup for a conventional (i.e., prior art) process for electroless plating of a membrane on a ceramic support.

FIG. 4B is a schematic of a setup for a process for electroless plating of a membrane on a ceramic support, according to embodiments of the present disclosure.

DETAILED DESCRIPTION

Figure 5:
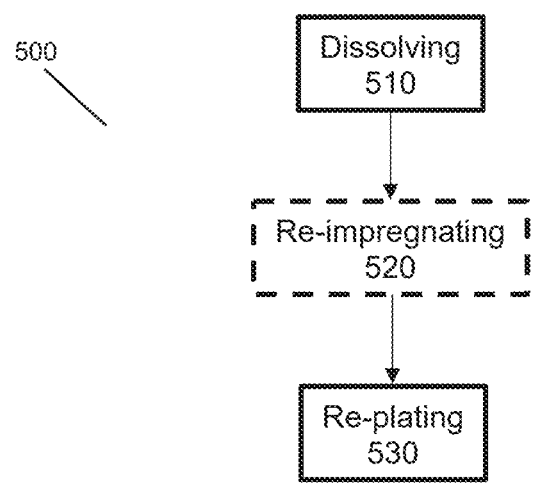
FIG. 5 is a flowchart of a method for recycling a flow tube of a CMR, according to embodiments of the present disclosure.

Unless defined otherwise, all technical and scientific terms used herein have the same meaning as is commonly understood by one of ordinary skill in the art. All patents, applications, published applications, and other publications to which reference is made herein are incorporated by reference in their entirety. If there is a plurality of definitions for a term herein, the definition provided in the Summary prevails unless otherwise stated.

For purposes of further disclosure and to comply with applicable written description and enablement requirements, the following references generally relate to systems and methods for catalytic membrane reactors and/or decomposition of ammonia to hydrogen and are hereby incorporated by reference in their entireties:

Zhenyu Zhang et al., "Efficient ammonia decomposition in a catalytic membrane reactor to enable hydrogen storage and utilization," 7 (6) *ACS Sustainable Chemical Engineering* 5975 (February 2019) ("Zhang").

U.S. Pat. No. 11,090,628, entitled "Catalytic membrane reactor, methods of making the same and methods of using the same for dehydrogenation reactions," issued 17 Aug. 2021 to Way et al. (hereinafter "the '628 patent").

Rok Sitar et al., "Compact ammonia reforming at low temperature using catalytic membrane reactors," 644 *Journal of Membrane Science* 120147 (February 2022) ("Sitar I").

Rok Sitar et al., "Efficient generation of H$_2$/NH$_3$ fuel mixtures for clean combustion," 36 (16) *Energy & Fuels* 9357 (August 2022) ("Sitar II").

The typical conventional approach to ammonia decomposition is illustrated in FIG. 1. In this approach, an inflowing ammonia feed stream 102 is partially decomposed to an outflowing product gas stream 104 comprising hydrogen and nitrogen gases (2 NH$_3$→N$_2$+3 H$_2$) in a packed bed reactor (PBR) 100 operated at ambient and/or atmospheric pressure and a temperature of at least about 600° C. The PBR 100 is typically packed with catalyst particles 106. The continually produced hydrogen gas inhibits the rate of ammonia decomposition, which constrains operation of the PBR 100 to high temperatures, and the nitrogen gas in the product gas stream 104 diminishes the heating value of the product gas stream 104 and increases its propensity for NOx formation during subsequent combustion. Because the levels of nitrogen gas and unreacted ammonia in the product gas stream 104 are typically undesirably high, the product gas stream 104 must then be sent to a downstream separation unit 120, e.g., a pressure swing adsorption unit, that separates a hydrogen gas stream 122 from a stream 124 comprising the byproducts and unreacted species.

Referring now to FIG. 2A, a conventional approach to the use of a catalytic membrane reactor (CMR) 200 to produce high-purity hydrogen is illustrated. In these embodiments, a feed vessel has a feed-facing surface in contact with a feed region 208, and a permeate-facing surface in contact with a permeate region 212. A particulate catalyst 106 is placed within the feed region 208 coated by a highly permeable, hydrogen-selective membrane 210. A catalyst, which may be the same catalyst or a different catalyst as is placed in the feed region 208, is also impregnated into the feed vessel itself, which typically comprises a ceramic support material such as yttria-stabilized zirconia (YSZ). Hydrogen gas is removed from the feed region 208 through the hydrogen-selective membrane 210 to the permeate region 212. In this conventional approach, a sweep gas is not introduced into the permeate region 212 to collect the hydrogen gas because a sweep gas would dilute the permeate stream 216, thus mandating an additional separation step. In the absence of a sweep gas stream, the released hydrogen cannot be fully recovered and can only be enhanced with large pressure gradients across the hydrogen-selective membrane 210, which increases hydrogen flux but also the flux of undesired impurities (e.g., NH$_3$, N$_2$, CO), which in turn restricts membrane selectivity. As a result, in the conventional approach illustrated in FIG. 2A, the integrity of the hydrogen-selective membrane 210 is of major importance; the hydrogen-selective membrane 210 must have as few defects as possible, to minimize the amount of ammonia, N$_2$, carbon monoxide, etc. in the permeate stream 216, as this can be deleterious for certain fuel cell applications.

Referring now to FIG. 2B, the use of a membrane reactor to produce a hydrogen-enriched fuel mixture for combustion applications according to embodiments of the present disclosure is illustrated. In the embodiment illustrated in FIG. 2B, the membrane reactor used is a CMR 200 whose basic construction is the same as that illustrated in FIG. 2A, but it is to be expressly understood that any type of MR, such as a PBMR, an FBMR, etc., may suitably be used in the practice of the approach illustrated in FIG. 2B. It is also to be expressly understood that, although the illustration of FIG. 2B generally contemplates a spatial arrangement of the various features in which the feed region 208 and permeate region 212 have a generally tubular shape, with the feed region 208 being an "inner volume" enclosed by an interior flow tube that is annularly surrounded by the "exterior volume" of the permeate region 212, the MR 200 may have any spatial arrangement of features (e.g., a tubular reactor with the permeate region 212 on the "inside" and the feed region 208 on the "outside;" planar feed region 208 and permeate region 212 disposed side-by-side or one atop the other; and so on) so long as hydrogen gas can pass from the feed region 208 through the hydrogen-selective membrane 210 into the permeate region 212. Unlike in the conventional approach illustrated in FIG. 2A, the embodiment illustrated in FIG. 2B utilizes a flow of a sweep gas 218, which mixes with the evolved hydrogen in the permeate region 212 to form the permeate stream 216.

While in many embodiments the hydrogen-containing gas in the inflowing feed stream 102 of the embodiment of the present disclosure illustrated in FIG. 2B may be ammonia, it is to be expressly understood that the feed stream 102 may additionally or alternatively comprise any hydrogen-containing gas that may be catalytically decomposed at the conditions encountered within the MR 200, such as, by way of non-limiting example, natural gas, steam, catalytically decomposable hydrocarbons (e.g., methane, ethane, propane, butane, etc.), catalytically decomposable alcohols (e.g., methanol, ethanol, etc.), and the like, and may further comprise one or more non-hydrogen-containing gases (e.g., carbon monoxide). The sweep gas 218 comprises a gaseous, combustible fuel, which may in some embodiments be the same hydrogen-containing gas, or one of the same hydrogen-containing gases, as is present in the feed stream 102 (e.g., the feed stream 102 and sweep gas 218 may both comprise ammonia) or alternatively may be a different gas from that which is decomposed in the feed region 208 (e.g., the feed stream 102 may comprise ammonia but not methane and the sweep gas 218 may comprise methane but not ammonia, or vice versa). In some embodiments in which the feed stream 102 and the sweep gas 218 comprise one or more of the same hydrogen-containing gases, it may be possible to provide a single stream of the hydrogen-containing gas and simply split or divert selected (and, in many embodiments, adjustable) proportions of this single stream into the feed region 208 and the permeate region 212, respectively; this may enable easy and rapid adjustment of the "sweep ratio" (i.e., the volumetric ratio of the sweep gas 218 to the feed stream 102) during operation. As further described throughout this disclosure, those skilled in the art can, in view of this disclosure, readily select appropriate hydrogen-containing gases for the feed stream 102 and an appropriate sweep gas 218 to produce a hydrogen-enriched fuel mixture (i.e., the permeate stream 216) with desired combustion properties.

The embodiments illustrated in FIG. 2B can have any one or more numerous advantages. By way of first non-limiting example, the use of the sweep gas 218 may in some embodiments increase the driving force for hydrogen recovery, thereby enhancing the overall efficiency of the MR 200 and enabling operation of the MR 200 with substantially greater pressures in the feed region 208; particularly, the pressure of the retentate stream 214 may be from about 5 atm to about 40 atm (or alternatively at least about 5 atm, at least about 10 atm, at least about 15 atm, at least about 20 atm, at least about 25 atm, at least about 30 atm, or at least about 35 atm, and/or no more than about 40 atm, no more than about 35 atm, no more than about 30 atm, no more than about 25 atm, no more than about 20 atm, no more than about 15 atm, or no more than about 10 atm, or in any range between any two of the aforementioned pressure values). By way of second non-limiting example, the purity of the hydrogen-selective membrane 210 is not a major concern in the embodiments illustrated in FIG. 2B, which in turn allows for a reduction in membrane thickness and a concomitant improvement in process performance and economics. By way of third non-limiting example, the embodiments illustrated in FIG. 2B enable the production of a permeate stream 216 at elevated pressure (e.g., any pressure from about ambient/atmospheric pressure to about the pressure of the retentate stream 214) by simply heating the feed stream 102, thereby eliminating the need for energy-intensive compression of the permeate stream 216. By way of fourth non-limiting example, in the embodiments illustrated in FIG. 2B, the composition (i.e., the relative concentrations of $H_2$ and fuel) in the permeate stream 216 may be rapidly adjusted by altering the relative flowrates of the feed stream 102 and the sweep gas 218.

In typical embodiments as illustrated in FIG. 2B in which the hydrogen-containing gas of the feed stream 102 is ammonia, the pressure of the retentate stream 214 when using mass flow controllers is limited to no more than about 7 atm to prevent condensation of ammonia. However, the feed stream 102 may in some such embodiments be delivered as a liquid and then flashed immediately before being fed to the MR 200, which may allow much higher pressures (in some embodiments, at least as high as about 40 atm) to be obtained. In some such embodiments, at least a portion of any residual ammonia and/or hydrogen in the retentate stream 214 may be combusted, and at least a portion of the energy of this combustion may be used to drive ammonia vaporization and the endothermic ammonia decomposition reaction, making operation of the MR 200 nominally adiabatic.

Referring now to FIG. 3, a method 300 for fabricating a CMR, e.g., CMRs 200 as shown in FIGS. 2A and 2B, is illustrated. The method comprises an impregnating step 310 and a plating step 320, the latter of which comprises an immersing sub-step 322, an intermittent sonicating sub-step 324, and a rotating sub-step 326.

In the impregnating step 310, an outer surface of a ceramic support, e.g., an yttria-stabilized zirconia support, is impregnated with a metal catalyst suitable to catalyze decomposition of ammonia (or other hydrogen-containing gas) to hydrogen gas, e.g., a ruthenium catalyst, by any suitable impregnation technique, such as, for example, the impregnation techniques described in Zhang and as step 62 in FIG. 5A of the '628 patent; in some embodiments, only the outer surface of the ceramic support may be impregnated with the metal catalyst (e.g., where the ceramic support is an open tube, the tube may be filled with water and capped to prevent contact of an impregnation solution with an interior surface of the ceramic support, as described in Zhang and as step 60 in FIG. 5A of the '628 patent), while in other embodiments an inner surface of the ceramic support may also be impregnated with the metal catalyst.

In the plating step 320 of the method 300 illustrated in FIG. 3, the outer surface of the ceramic support is plated with the hydrogen-selective membrane by an electroless plating procedure, which may be similar to the electroless plating steps described in Zhang and as steps 72 and 74 in FIG. 5B of the '628 patent, but with several important changes and improvements. Particularly, the plating step 320 of the method 300 includes an intermittent sonicating sub-step 324 and a rotating sub-step 326. In the intermittent sonicating sub-step 324, the bath of the plating solution is subjected to intermittent pulses of ultrasonic energy to mitigate the formation of gas bubbles or force the dislodgement of bubbles adhered to the membrane by decomposition of a reducing agent, e.g., hydrazine, which is believed to contribute to the creation of defects and non-uniformity in the membrane; as further described throughout this disclosure, intermittent or pulsed sonication is preferable to continuous sonication, as the latter can incite undesired homogeneous nucleation. In the rotating sub-step 326, the ceramic support is rotated within the bath of the plating solution during the plating step 320 to further assist in bubble removal and ensure that the plating solution remains well-mixed throughout the plating process. These modifications provide greater control over the plating process by ensuring the consistent removal of gas bubbles from the surface of the ceramic support. A comparison of the setups for an electroless plating step without sonication (or with continuous sonication) and without rotation, as described in Zhang and the '628 patent, and for the electroless plating step 320 of the method 300 are illustrated in FIGS. 4A and 4B, respectively. Following the impregnating step 310 and the plating step 320, the impregnated and plated ceramic support may be suitable for use, e.g., as a flow tube of a CMR as illustrated in FIGS. 2A and 2B.

It is to be expressly understood that in the method 300 illustrated in FIG. 3, the intermittent sonicating sub-step 324 and the rotating sub-step 326 are preferably carried out substantially simultaneously, although one of these sub-steps may begin or end before or after the other sub-step without departing from the scope of the present disclosure. More generally, it is to be expressly understood that a method for fabricating a CMR according to the present disclosure may include one or more additional steps (e.g., steps of the methods described in Zhang and/or illustrated in FIGS. 5A and 5B of the '628 patent) not illustrated in FIG. 3.

Referring now to FIG. 5, a method 500 for recycling a flow tube of a CMR (e.g., a CMR 200 as illustrated in FIGS. 2A and 2B) is illustrated. The method comprises at least a dissolving step 510 and a re-plating step 530, and may in some embodiments further include a re-impregnating step 520. In the dissolving step 510, the palladium membrane of an interior flow tube of a CMR is dissolved in a suitable solvent, typically a strong acid and most typically aqua regia (i.e., a mixture of hydrochloric acid and nitric acid in a molar ratio of approximately 3:1); palladium is highly soluble in aqua regia, and techniques for the recovery of palladium from aqua regia are well-known in the art. As further described elsewhere in this disclosure, the dissolving step 510 may in some embodiments strip a small portion of the metal catalyst (e.g., a ruthenium catalyst) from the outer surface of the flow tube; thus, in some embodiments, a re-impregnating step 520 (e.g., a procedure similar to that of the impregnating step 310 illustrated in FIG. 3 and described above) may be carried out to replace any metal catalyst lost in the dissolving step 510. A new palladium membrane is then plated onto the outer surface of the flow tube in plating step 530; the plating step 530 may be a conventional electroless plating step (e.g., as described in Zhang and the '628 patent), or may be an electroless plating step comprising intermittent sonication and rotation of the flow tube in the plating solution, such as the plating step 320 illustrated in FIG. 3 and described above. The palladium used in plating step 530 may, in some embodiments, include at least a portion of the palladium dissolved in dissolving step 510 and recovered from the acid solution, or alternatively may be an entirely "fresh" source of palladium. As with the method 300 illustrated in FIG. 3, it is to be expressly understood that a method for recycling a CMR according to the present disclosure may include one or more additional steps for fabricating a CMR (e.g., steps of the methods described in Zhang and/or illustrated in FIGS. 5A and 5B of the '628 patent) not illustrated in FIG. 5.

The methods and systems of the present disclosure are further described by way of the following illustrative, non-limiting experimental Examples.

Example 1

Performance of Ammonia Reformer with Ammonia Sweep Gas

A CMR ammonia reformer was fabricated from a porous yttria-stabilized zirconia (YSZ) tubular support (7.1 cm length, 1.0 cm outer diameter, 0.7 cm inner diameter) impregnated with a ruthenium catalyst and coated with an electroless-deposited palladium membrane by the procedure described in Example 7 below. The ruthenium loading in the ceramic support was 0.45 wt % and the palladium membrane was gravimetrically determined to have a thickness of 2.68 μm. At a temperature of 450° C., this CMR exhibited $H_2$ permeance of $1.42 \cdot 10^{-3}$ mol m$^{-2}$ s$^{-1}$ Pa$^{-0.5}$ and a selectivity over $N_2$ of greater than 10,000. Subsequently, to enhance ammonia decomposition performance, the lumen of the CMR reformer was loaded with 5.6 g of a commercially available 0.5 wt % Ru/a-Al$_2$O$_3$ catalyst.

Ammonia was delivered through the feed side and controlled using a Parker mass flow controller. Some experiments were performed without a sweep gas, while other experiments were performed with an ammonia sweep gas, a methane sweep gas, or an $N_2$ sweep gas. The retentate pressure was fixed at 5 barg using an electronic back pressure regulator; the permeate pressure varied between 0 barg and 5 barg and was set by a manual pressure regulator. Permeate and retentate flowrates wre measured using a combination of Parker mass flow meters, Humonics Optiflow 520 bubble flow meters, and gas chromatography readings and mass balance calculations. The gas composition of the permeate and retentate streams was analyzed using an Agilent Technologies 6890N gas chromatograph equipped with an HP-PlotU column and/or an NDIR (NDIR) for low levels of ammonia in the permeate stream. At each experimental condition, periodic sampling was used to ensure steady-state operation, defined as the collection of five data points with a standard deviation of less than 1.0%. The ammonia conversion $X_{NH3}$ and hydrogen recovery $R_{H2}$, were calculated according to the following two equations:

$$X_{NH_3} = \frac{NH_{3,in} - NH_{3,out}}{NH_{3,in}}$$

$$R_{H_2} = \frac{H_{2,permeate}}{1.5 \cdot NH_{3,in}}$$

where $NH_{3,in}$, $NH_{3,out}$, and $H_{2,permeate}$ are molar quantities of ammonia into the reactor, ammonia out of the reactor, and hydrogen in the permeate stream, respectively.

A 1D reactor model was used to simulate and predict reformer performance using the following coupled differential equations:

$$\frac{dF_i}{dV} = v_i r - \kappa(P_{H_2,F} - P_{H_2,S})$$

$$\frac{dF_{H_2}}{dV} = \kappa(P_{H_2,F} - P_{H_2,S})$$

where $F_i$ is the molar flowrate of component i, $v_i$ is the stoichiometric coefficient, κ is the hydrogen permeance, and $P_{H2,F}$ and $P_{H2,S}$ denote the hydrogen partial pressures in the feed and sweep streams, respectively. The ammonia decomposition reaction was modeled using the following form of the Temkin-Pyzhev rate equation:

$$r = \frac{k(K_A P_A)^2}{(K_A P_A + P_H^{1.5})^2}$$

where k and $K_A$ are adjustable parameters and $P_A$ and $P_H$ are the partial pressures of ammonia and hydrogen, respectively. It was found that k is insensitive to temperature and fixed at about 0.14 mol hr$^{-1}$ g$_{cat}^{-1}$, while $K_A$ was fit to an Arrhenius expression with A=3.88. 10$^{-9}$ bar$^{-1}$ and EA=30.3 kcal mol$^{-1}$. Based on experimental measurements, the model assumed perfect selectivity for hydrogen. The $H_2$ permeance was an adjustable parameter in the model, and the value that yielded the best fit to the ammonia decomposition experimental data was approximately half that of the pure gas permeance, reflecting radial transport limitations not otherwise accounted for in the model. Similarly, a linear driving force was found to better agree with the experimental data than a square root driving force, again reflecting external transport limitations not otherwise accounted for. In the simulations, a single value of K was selected to provide the best fit to the data when the CMR was operated without a sweep gas and with a permeate consisting entirely of $H_2$ at ambient pressure; this value was used in all subsequent simulations involving the use of a sweep gas or elevated permeate pressure.

Figure 6A:
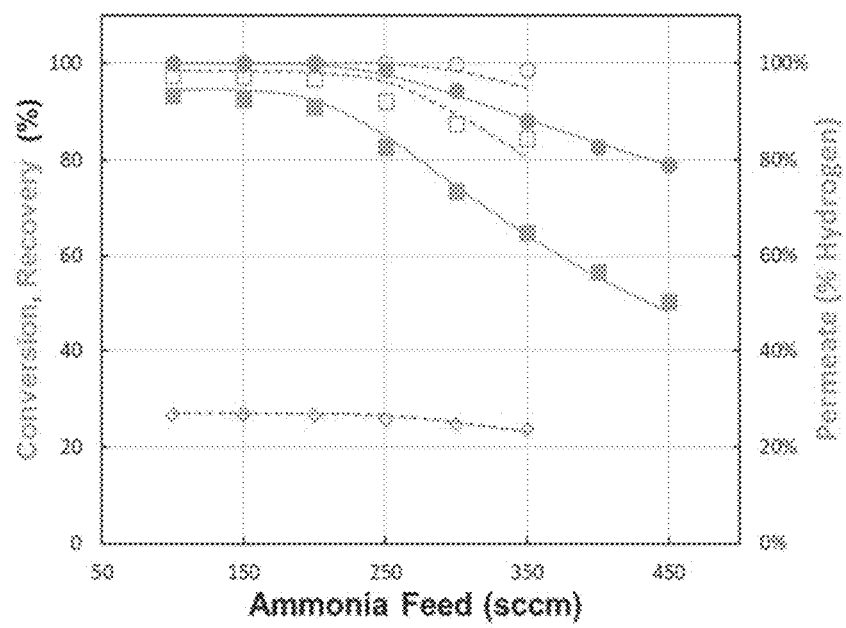
FIG. 6A is a comparison of ammonia conversion, hydrogen recovery, and permeate composition (points) with model predictions (lines) as functions of ammonia feed flowrate in a CMR at an operating temperature of 450° C., according to embodiments of the present disclosure.
Figure 6B:
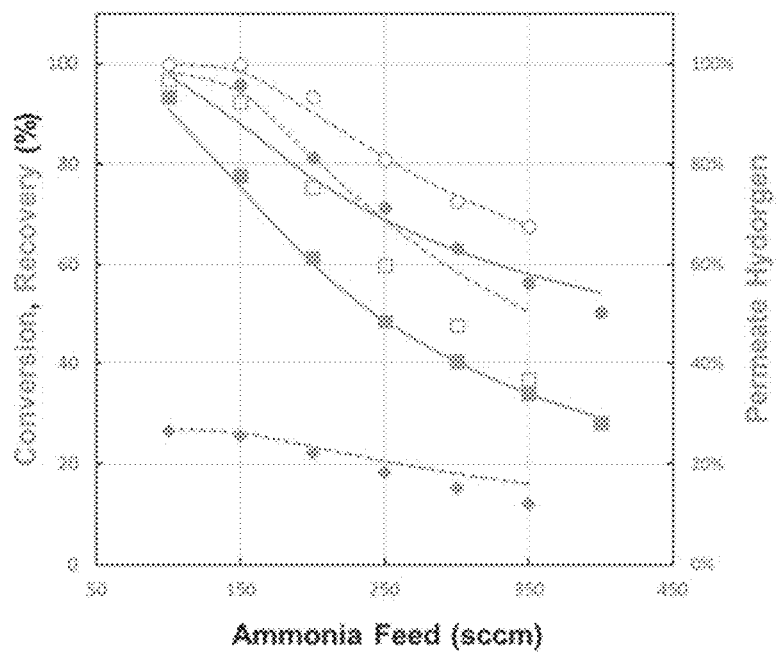
FIG. 6B is a comparison of ammonia conversion, hydrogen recovery, and permeate composition (points) with model predictions (lines) as functions of ammonia feed flowrate in a CMR at an operating temperatures of 400° C., according to embodiments of the present disclosure.

FIGS. 6A and 6B illustrate a comparison of model predictions with experimental performance for the CMR reformer operated with and without an ammonia sweep at a feed pressure of 5 barg and a permeate pressure of 0 barg, at temperatures of 450° C. (FIG. 6A) and 400° C. (FIG. 6B). In FIGS. 6A and 6B, lines represent model predictions and points represent experimental data; experimental data points for ammonia conversion, hydrogen recovery, and permeate composition are represented by circles, squares, and diamonds, respectively; and tests/models with no sweep gas are represented by solid data points and lines while tests/models with an ammonia sweep gas (provided at a 4:1 molar/volume ratio relative to the permeate gas, hereinafter referred to as the "sweep ratio") are represented by open data points and dashed lines.

As FIG. 6A illustrates, at a temperature of 450° C. when the hydrogen recovery is significantly greater when the sweep gas is employed and approaches unity and in addition the ammonia feed to the lumen of the CMR could be increased by 40% (from 250 to 350 sccm) while maintaining the high levels of conversion and recovery obtained without a sweep; at this condition, the composition of the permeate was about 25% $H_2$. The use of the ammonia sweep flowrate escalates the pressure driving force increase across the membrane, which is caused by the dilution of hydrogen on the permeate side. This both increases the level of hydrogen recovery and has the secondary benefit of enhancing decomposition kinetics by suppressing $H_2$ inhibition.

As FIG. 6B illustrates, at a temperature of 400° C. performance declines but the benefits of a sweep gas remain clear. There are two contributors to the performance decline: loss of catalytic activity (reflecting the 30 kcal/mol activation energy and a need to reduce the ammonia feed flowrate to maintain complete conversion) and an approximately 20% reduction in membrane permeability, which also detracts from $H_2$ recovery.

Figure 7:
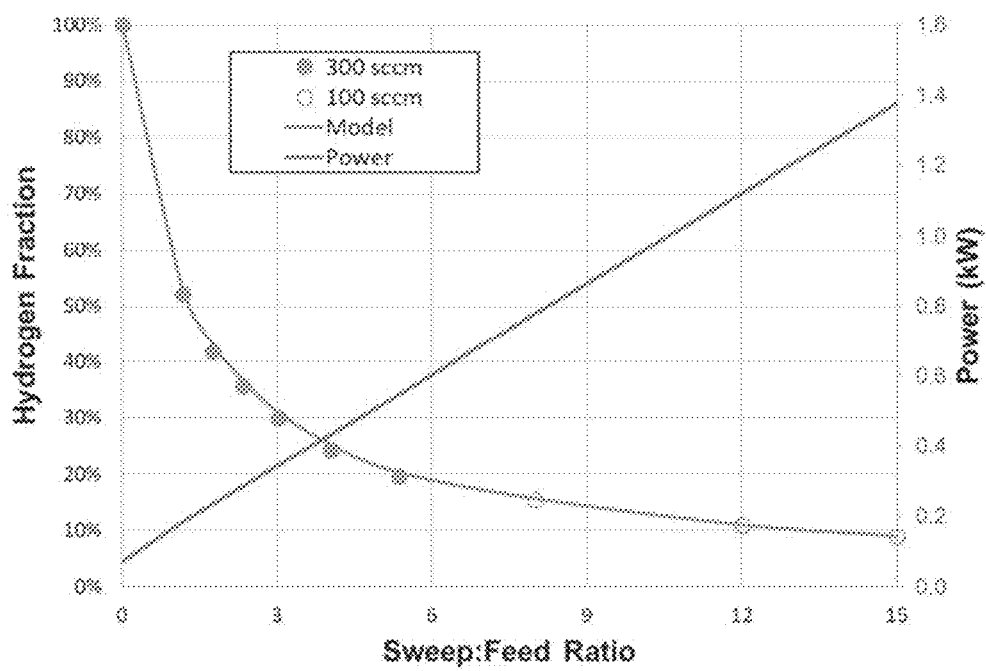
FIG. 7 is a graph of permeate composition as a function of sweep ratio, according to embodiments of the present disclosure.

FIG. 7 illustrates the ability to "tune" the permeate composition, and particularly demonstrates that any hydrogen concentration in the permeate stream from 10% to 100% (by mole or volume) $H_2$ can be selected, with near-perfect consistency and agreement with model predictions (downward-trending curve), merely by altering the ratio of the sweep and feed gases. In these experiments, the flowrate of ammonia fed to the CMR lumen was fixed at either 300 sccm (solid data points) or 100 sccm (open data points), and the flowrate of ammonia sweep gas was varied to provide a selected sweep: feed ratio. Under these operating conditions, the amount of $H_2$ recovered from the CMR remains essentially independent of the sweep rate, such that the composition of the permeate gas can be tuned effectively instantly by changing the sweep rate. Notably, the expected combustion power of the permeate gas, calculated as the product of the flowrate and higher heating value of the permeate gas (upward trending line), increases with increasing sweep rate; as illustrated in FIG. 7, the small CMR ammonia reformer of this Example can produce kilowatt levels of combustion power.

Example 2

Fuel Generation at Elevated Pressure

Figure 8A:
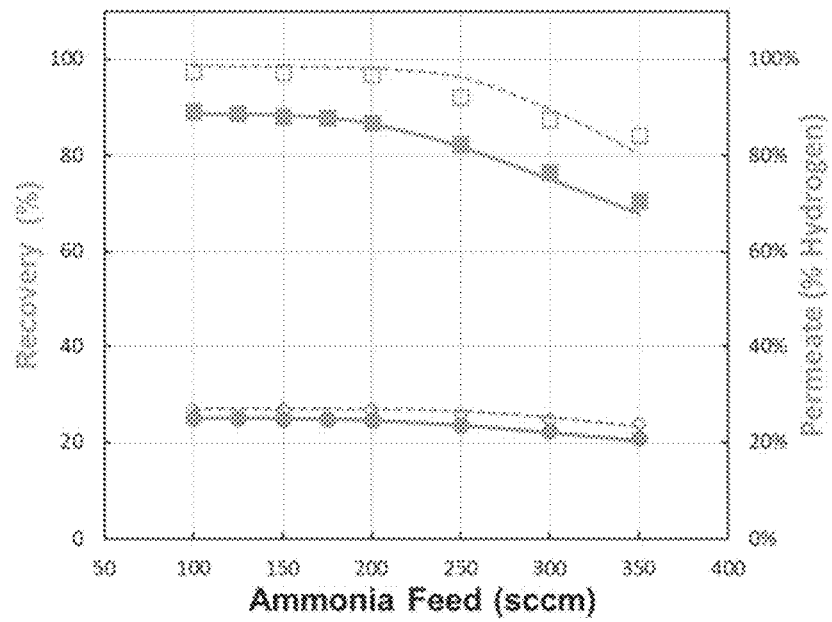
FIGS. 8A and 8B are graphs of hydrogen recovery and permeate composition as functions of ammonia feed flowrate and permeate pressure, respectively, according to embodiments of the present disclosure.
Figure 8B:
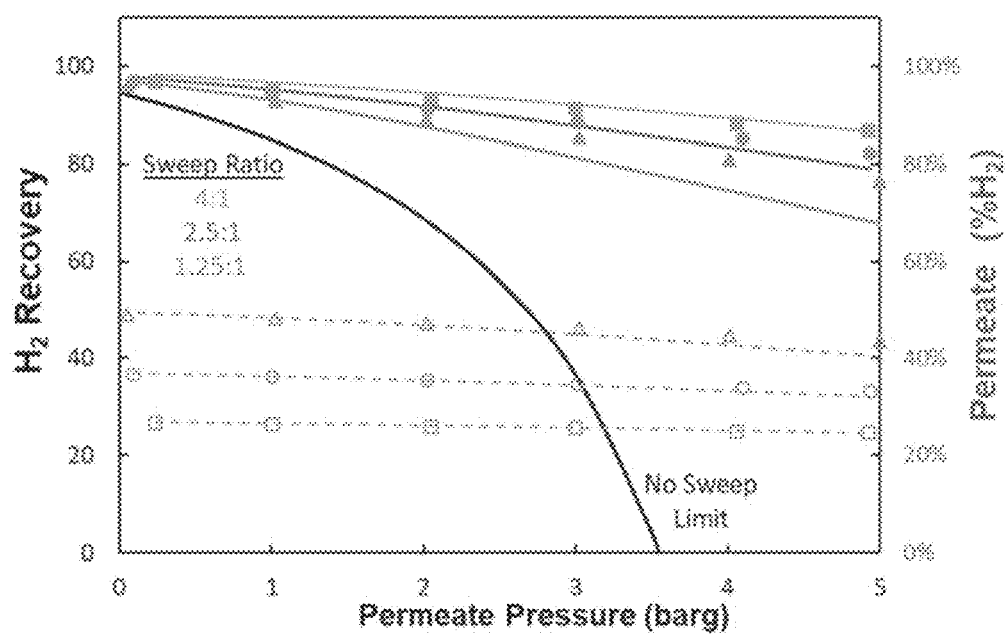

FIGS. 8A and 8B illustrate the performance of the CMR described in Example 1 at elevated permeate collection pressure with the predictions of the model described in Example 1 at a temperature of 450° C., an ammonia sweep ratio of 4:1, and a pressure of the feed to the CMR lumen of 5 barg. In FIGS. 8A and 8B, experimental data are represented by points while model predictions are represented by lines. In FIG. 15A, open data points and dashed lines represent a permeate pressure of 0 barg while solid data points and lines represent a permeate pressure of 5 barg, and $H_2$ recovery and permeate composition data points are represented by squares and circles, respectively. In FIG. 8B, open data points and dashed lines correspond to the $H_2$ percentage in the permeate gas while solid data points and lines correspond to $H_2$ recovery, and squares, circles, and triangles represent sweep ratios of 4:1, 2.5:1, and 1.25:1, respectively.

As FIG. 8A illustrates, increasing the permeate pressure from 0 barg to 5 barg drops the theoretical hydrogen recovery from 98% to 90%. Although not shown in FIG. 8A, the conversion in both cases was nominally identical.

FIG. 8B illustrates how CMR performance changes with changes in permeate pressure at three different sweep ratios: 4:1 (squares), 2.5:1 (circles), and 1.25:1 (triangles). The solid line without corresponding data points is the theoretical limit for hydrogen recovery with no sweep gas and a feed pressure of 5 barg; as illustrated in FIG. 15B, the theoretical recovery falls off sharply with increasing feed pressure and drops to zero at a pressure of 3.67 barg. By contrast, as the other solid curves show, high levels of recovery can be maintained at feed pressures at least as high as 5 barg with isobaric operations, and improve with increasing sweep ratio; the ability to deliver $NH_3/H_2$ mixtures at elevated pressure without the need for compression represents an important advantage of the CMR ammonia reformers of the present disclosure. Although this study limited the feed pressure of the ammonia to no more than 5 barg to prevent the ammonia from condensing in the mass flow controller, at scale it may be practical, and it is within the scope of the present disclosure, to deliver the ammonia in liquid form and flash the ammonia shortly before it enters the reformer, enabling delivery of the ammonia at very high pressures (at least as high as 30 bar) suitable for gas turbine applications; the capital and operating expenses associated with pumping cold liquid ammonia are insignificant relative to the expenses associated with compressing hot ammonia vapor, and flashing of the ammonia before entering the reformer can be accomplished with low-grade heat because the vapor pressure of ammonia is greater than 60 bar at a temperature of 100° C.

Example 3

Low-Temperature CMR Reformer Operation

Figure 9A:
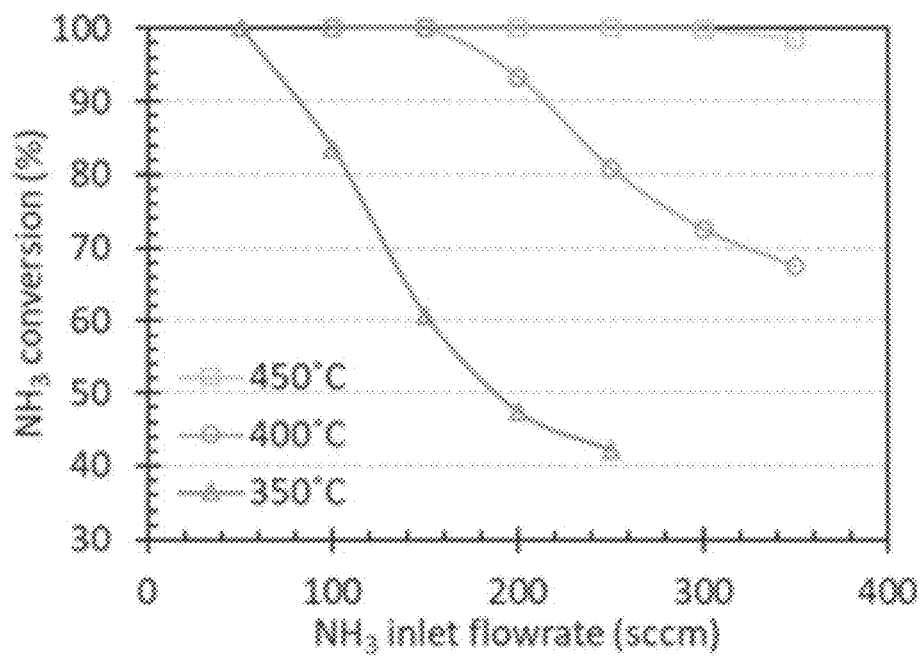
FIGS. 9A and 9B are graphs of ammonia conversion and hydrogen recovery, respectively, as functions of ammonia feed flowrate, according to embodiments of the present disclosure.
Figure 9B:
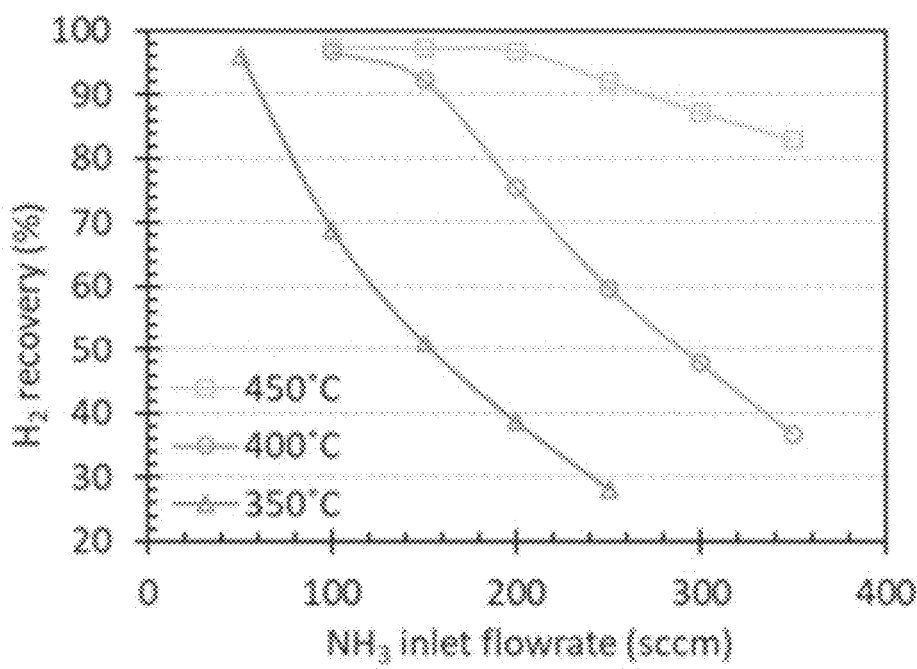

FIGS. 9A and 9B illustrate ammonia conversion and hydrogen recovery, respectively, as functions of ammonia feed flowrate at CMR reformer operating temperatures of 450° C. (squares), 400° C. (circles), and 350° C. (triangles) using a 4:1 sweep ratio. As FIGS. 9A and 9B illustrate, at any given flowrate there is a considerable decline in both conversion and recovery as temperature decreases, which to a first approximation reflects the exponential decline in catalytic activity with lower temperature. Particularly, the flowrate limit for complete ammonia conversion (FIG. 9A) drops from about 325 sccm at 450° C. to about 150 sccm at 400° C. and about 50 sccm at 350° C. Hydrogen recovery (FIG. 9B) is shifted in a similar manner, and in fact decreases even more steeply, as there is also a decrease of about 30% in the hydrogen permeability of the membrane when dropping the temperature from 450° C. to 350° C. Nevertheless, FIGS. 9A and 9B also illustrate that conversion and recovery may yet be sufficient for some applications even at temperatures as low as about 350° C.

Figure 10A:
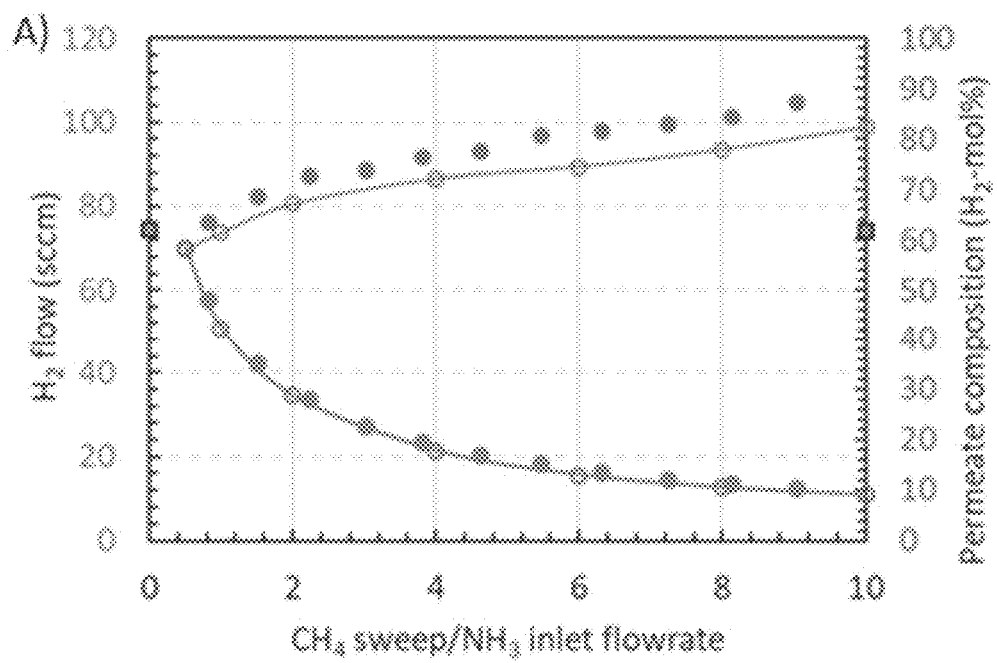
FIG. 10A is a graph of hydrogen flow and permeate composition as functions of sweep ratio, according to embodiments of the present disclosure.
Figure 10B:
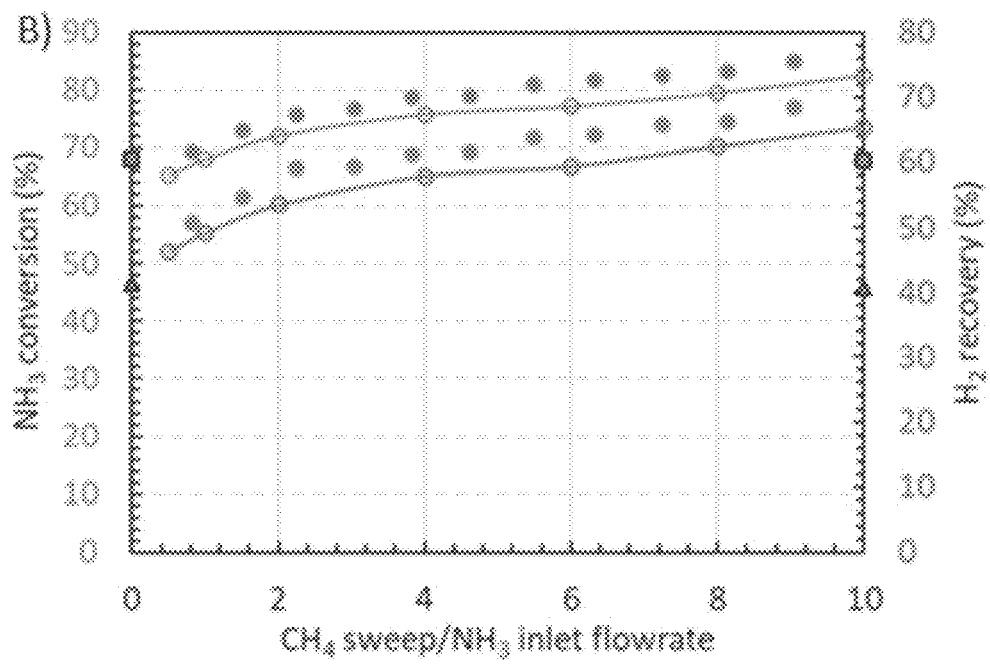
FIG. 10B is a graph of ammonia recovery and hydrogen recovery as functions of sweep ratio, according to embodiments of the present disclosure.
Figure 11A:
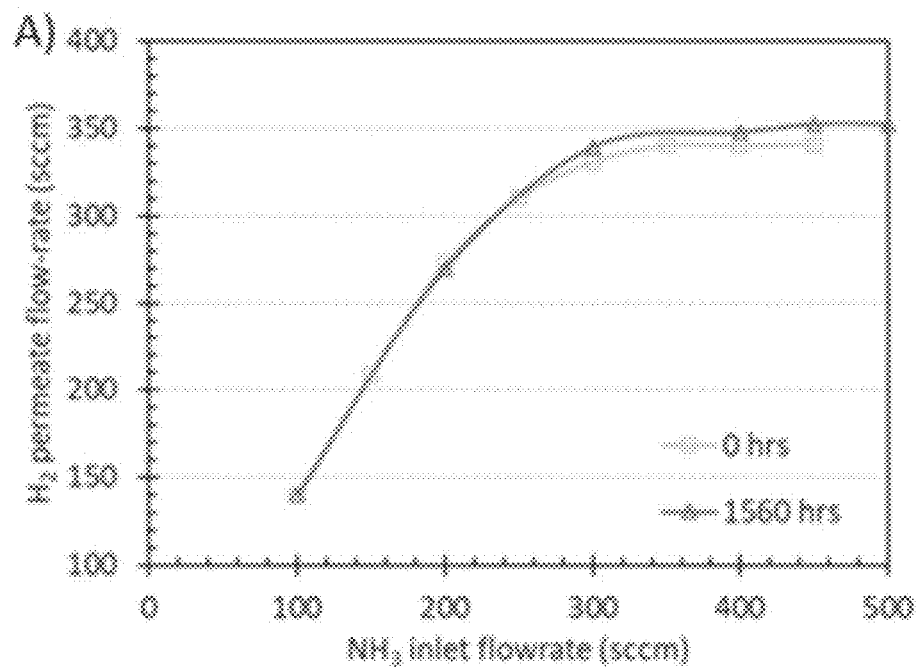
FIGS. 11A, 11B, 11C, and 11D are graphs of permeate flow rate, ammonia impurity concentration, ammonia conversion, and hydrogen recovery, respectively, as functions of ammonia feed flowrate, according to embodiments of the present disclosure.
Figure 11B:
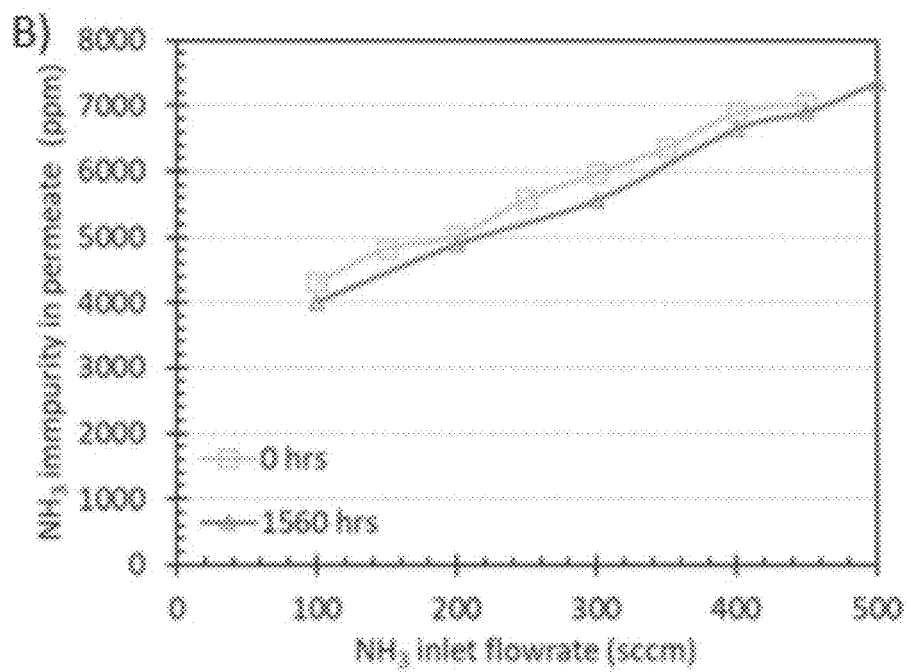
Figure 11C:
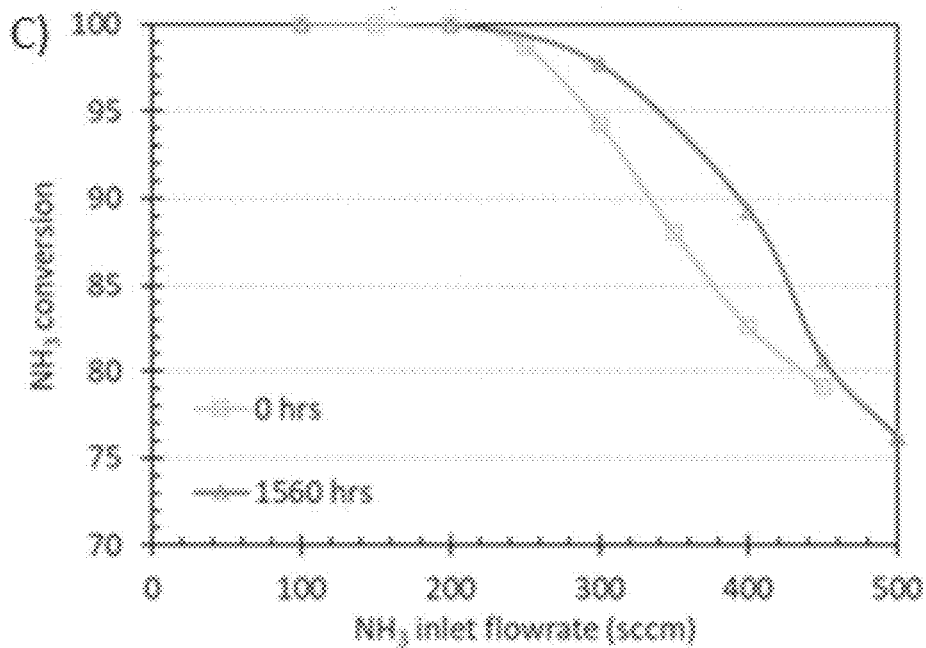
Figure 11D:
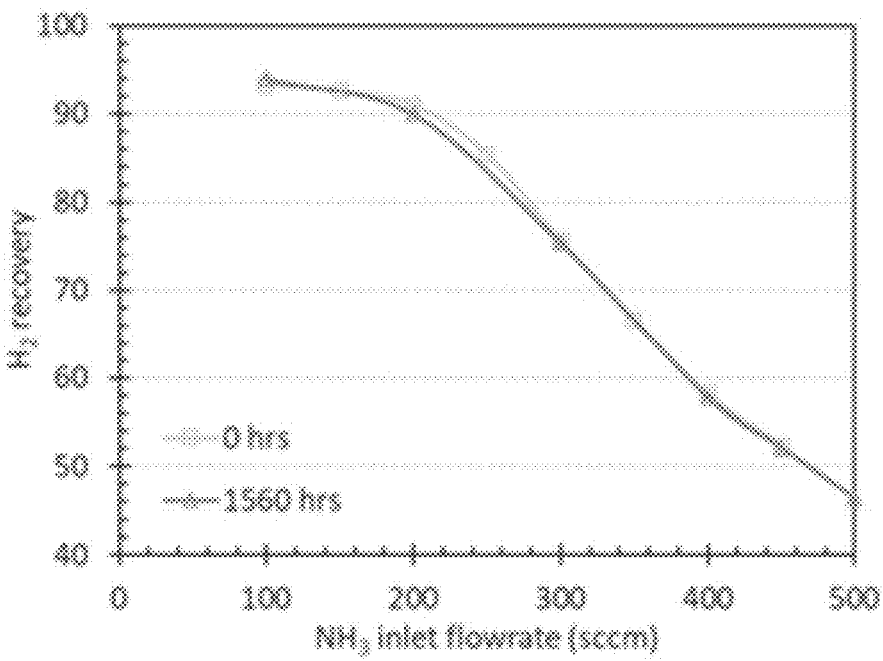

Low-temperature operation is particularly critical for the production of hydrogen/methane gas blends, because palladium membranes, which are frequently employed in CMRs and other membrane reactor types, can catalyze methane decomposition (and subsequent poisoning of the membrane) at temperatures as low as 450° C. Experimental results using methane or nitrogen as the sweep gas are illustrated in FIGS. 10A and 10B; in these experiments, the ammonia inlet flowrate, operating temperature, feed pressure, and permeate pressure were held constant at 100 sccm, 350° C., 5 barg, and 0 barg, respectively, while the sweep gas flowrate was varied from 50 to 900 sccm. As illustrated in FIGS. 10A and 10B, both sweep gases provided nominally identical performance; although methane (solid data points) appears to have a slight systematic advantage over nitrogen (open data points) as a sweep gas, this is believed to be an artifact of mass flow controller/mass flow meter calibration offsets. As expected, and similar to embodiments utilizing an ammonia sweep gas, an increase in sweep ratio elevates both ammonia conversion and hydrogen recovery. Perhaps the most important result illustrated in FIGS. 10A and 10B is the excellent stability of the palladium membrane under a methane sweep gas; the solid squares and triangles on the left and right edges of FIGS. 10A and 10B show the performance of the CMR reformer without a sweep before and after performing the methane sweep, with no detectable change in performance whatsoever, confirming that palladium membrane CMR reformers can be successfully operated under a methane sweep gas at temperatures at least as high as 350° C.

Example 4

CMR Ammonia Reformer Durability

The CMR ammonia reformer described in Examples 1-3 was continuously operated to decompose an ammonia feed stream for about 1560 hours over a wide range of temperatures (350 to 450° C.) and permeate pressures (0 to 5 barg) and using different sweep gases (ammonia, methane, and nitrogen). The performance of the CMR with no sweep gas flow was evaluated at the start and end of this period to assess the durability of the CMR reformer. FIGS. 11A through 11D illustrate the results of this evaluation; data at 0 hours are represented by square data points, while data at 1560 hours are represented by triangular data points. As FIGS. 11A through 11D show, these data confirm the excellent durability of the CMR, in that the performance of the CMR reformer was slightly improved at the end of the 1560-hour ammonia decomposition trial. Particularly, the pure hydrogen permeance of the membrane (FIG. 11A) increased by about 15% (from $1.42 \cdot 10^{-3}$ to $1.62 \cdot 10^{-3}$ mol m$^2$ s$^{-1}$ Pa$^{-0.5}$), and there was no detectable nitrogen leakage (not illustrated) either before or after the trial. Similarly, the content of ammonia impurities in the permeate gas (FIG. 11B) was slightly decreased after 1560 hours of operation. Perhaps the most striking result, however, is the noticeably improved ammonia conversion (FIG. 11C) over the course of the trial, which the present inventors attribute to improved ruthenium catalyst performance. Without wishing to be bound by any particular theory, the present inventors hypothesize that the reducing environment provided by the continuous flow of ammonia may aid in the removal of minor impurities from the membrane (in much the same way that annealing/reducing under a hydrogen atmosphere is an important step in CMR fabrication, as previously described in the art and as those of ordinary skill in the art will appreciate), thereby improving both catalyst and membrane performance.

Example 5

Enhanced Hydrogen Recovery

When using a sweep gas to collect hydrogen and form a permeate gas stream according to the present disclosure, the sweep gas can be introduced in a co-current flow configuration (i.e., with the feed stream and sweep gas flowing in the same direction, as shown, for example, in FIG. 2B, in which both streams flow from the left of the figure to the right of the figure), or in a counter-current flow configuration (i.e., with the feed stream and sweep gas flowing in opposite directions; for example, in the context of FIG. 2B, with the sweep gas entering at the right side of the MR 200 and flowing from right to left). There are also MR configurations that are intermediate between these configurations, such as, by way of non-limiting example, a cross-flow configuration in which the sweep gas flows at an angle (in some embodiments, a right angle or orthogonally) relative to the direction of flow of the feed stream. An advantage of the counter-flow configuration is that it enables up to 100% recovery of the released hydrogen since there is none present in the sweep stream.

Figure 12:
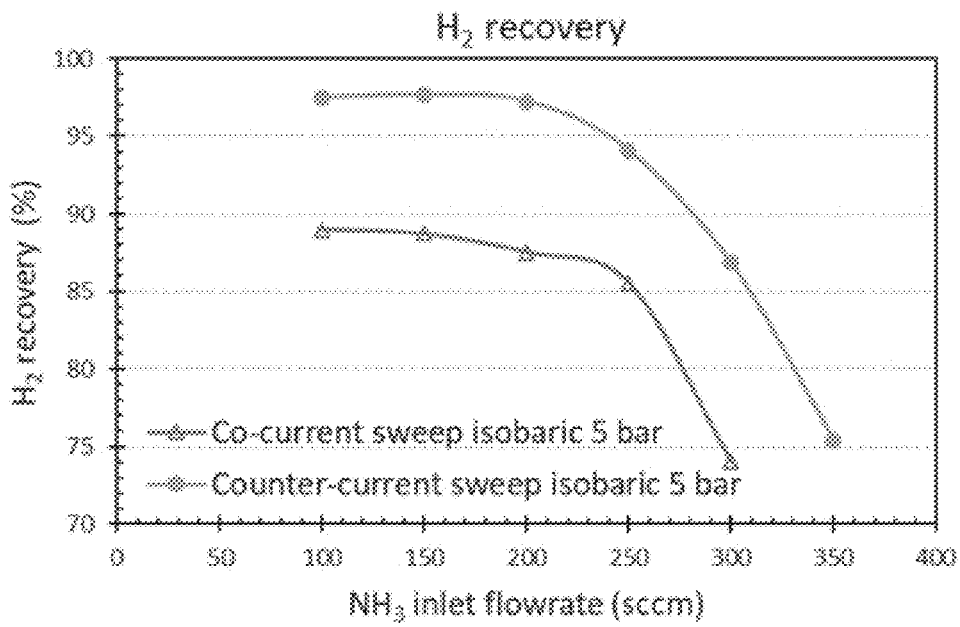
FIG. 12 is a comparison of hydrogen recovery as a function of ammonia inlet flowrate with co-current (triangles) and counter-current (circles) flow of sweep gas, according to embodiments of the present disclosure.

FIG. 12 compares the performance of the MR described in Examples 1-4 operated using a 4:1 ammonia sweep in both co-current flow and counter-current flow configurations under isobaric operation. Consistent with theoretical expectations, the hydrogen recovery increased from ~88% to ~98% and approaches the theoretical limit when switching from the co-current flow to the counter-current flow configuration. The hydrogen recovery in an MR under isobaric operation would be negligible without a sweep gas. Isobaric operation is also much safer, as it eliminates mechanical stress that can lead to membrane failure.

Example 6

Relaxation of Membrane Selectivity Constraints

Membrane reactors operated without a sweep require nearly defect-free membranes with very high selectivity to deliver high purity hydrogen. This requires relatively thick and expensive membranes. In the case of palladium-based membranes, it is desirable to reduce membrane thickness to both reduce cost and increase hydrogen permeance. However decreasing thickness increases the density of defects. Alternatively, it may in some embodiments be desirable to use lower cost membranes such as microporous ceramics. In both cases poor selectivity constrains these options. Impurities are transported through defects by two mechanisms: pressure driven flow and diffusion. The former mechanism is completely non-selective and dominates when there is a pressure differential across the membrane, which is required in the absence of a sweep to enable significant hydrogen recovery as discussed above. A pressure differential across the membrane enables non-selective transport of impurities through defects. As discussed above in Example 2, the use of a sweep gas enables the MR to be operated isobarically while achieving high hydrogen recovery. Isobaric operation eliminates the primary source of impurities and as such greatly reduces membrane selectivity requirements.

To illustrate this attribute, the performances of two membrane reactors were compared. Both membrane reactors had nominally identical levels of catalyst loading, but the first of these membrane reactors ("MR-I") employed a high quality palladium membrane that was 2.7 μm microns thick and had an ideal $H_2/N_2$ selectivity of 8083. The second of these membrane reactors ("MR-II") had a thin (1 μm) with significant defects and an ideal $H_2/N_2$ selectivity of just 198. These membranes were operated under identical conditions for the production of high-purity hydrogen from ammonia decomposition without a sweep gas under a 5 bar pressure differential, and for the production of a $H_2/NH_3$ mixture using a 4:1 ammonia sweep under isobaric operation. In MR-I, the nitrogen content in the permeate stream was below the gas chromatography (GC) detection limits in both cases. When MR-II was operated without a sweep gas stream, considerable $N_2$ was detected in the permeate stream (4.53 volume %). However, when the sweep stream was employed, the composition of the $H_2/NH_3$ fuel mixture was nominally identical to MR-I and the $N_2$ content in the permeate gas stream was below the GC detection limits. Thus, this method of MR operation enables the use of lower quality but less expensive membranes without impacting the quality of the $H_2$-enriched fuel blends.

Example 7

CMR Fabrication and Membrane Quality

Asymmetric yttria-stabilized zirconia (YSZ) tubes with an outer diameter of 1 cm and a wall thickness of 0.13 cm were cut to lengths of 10 cm for use as ceramic supports for an interior flow tube of a CMR. The bulk of these supports was made up of macropores several microns in size, with an outer 20 µm mesoporous region with pores on the order of 0.2 µm in size. The supports were impregnated with a ruthenium catalyst in a solution of ruthenium chloride hydrate in 75% acetone/25% deionized water by the procedure described in Zhang, except that the tubes were not capped and filled with deionized water (i.e., the inner and outer surfaces of the tubes were impregnated with the ruthenium catalyst simultaneously when immersed in the catalyst solution). The catalyst loading in the supports was determined gravimetrically to be about 1.0 wt %.

Reduction and palladium plating baths were prepared according to the procedure described in Zhang, but, to reduce the membrane thickness and increase the membrane length without comprising the hydrogen selectivity of the membrane, a number of changes were made to the membrane plating process described in Zhang. Particularly, to alleviate the formation of gas bubbles adhered to the membrane formed by the decomposition of the hydrazine reduction agent to ammonia and nitrogen, the plating solutions were placed in a sonication tank (Sonicor Ultrasonic Generator SS-6041) and, to offset heating induced by sonication, actively cooled to a temperature of 17.5±0.5° C. by an external refrigeration unit (Neslab RTE-211). It was found that continuous sonication could incite undesired homogeneous nucleation, but stable plating baths were achieved by conducting intermittent or "pulsed" sonication with a 110 ms "on"/65 ms "off" duty cycle. The ceramic supports were also rotated (145 rpm) throughout the plating procedure, which further assisted in bubble removal and ensured the solution remained well-mixed. These modifications provided greater control over the plating process through the consistent removal of gas bubbles from the surface, as illustrated in FIG. 4B (relative to FIG. 4A). Under these conditions, a palladium membrane was deposited on the surface of the ceramic supports at a rate of about 0.7 µm/hr.

The palladium plating process employed three one-hour reduction cycles and four 1.5-hour plating cycles, which was determined to be optimal for preventing bath instability and maximizing efficient use of the palladium source. The resulting CMR interior flow tubes were coated with substantially defect-free palladium membranes with an average thickness of 4.0±0.3 µm, an improvement of at least 35% relative to the membrane thickness of at least 6.2 µm reported by Zhang.

Figure 13:
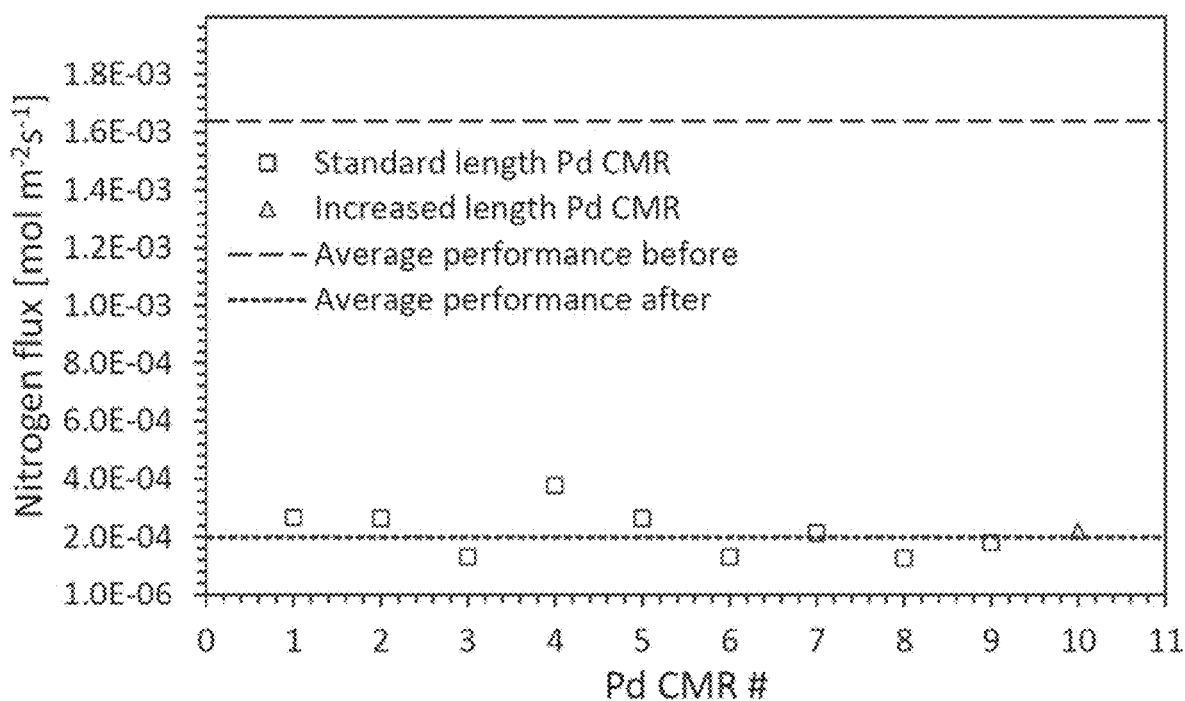
FIG. 13 is a graph comparing the nitrogen leak performance of CMRs fabricated by previously known methods against CMRs fabricated according to embodiments of the present disclosure.

To test the quality of the membranes, the fabricated CMR flow tubes were filled with nitrogen gas at 75 psi and room temperature and the leak rate was measured. As illustrated in FIG. 13, nine CMR flow tubes constructed according to this Example (square data points 1-9 in FIG. 13) had an average $N_2$ flux value (short-dashed line) of about $2.0 \cdot 10^{-4}$ mol m$^{-2}$ s$^{-1}$, a reduction of nearly 90% relative to the average value reported by Zhang (long-dashed line). A tenth CMR (triangular data point 10 in FIG. 13) was fabricated by an identical procedure except that the length of the ceramic support tube was doubled to 20 cm; this CMR demonstrated essentially identical nitrogen leak performance.

Example 8

Removal and Recovery of Palladium Membrane and Recycle of YSZ Supports

Figure 14A:
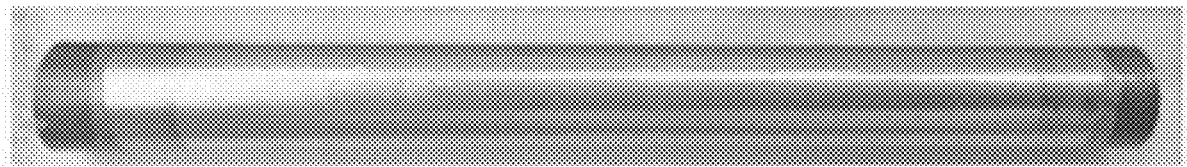
FIGS. 14A, 14B, and 14C are photographs of a flow tube of a catalytic membrane reactor before palladium membrane dissolution, after palladium membrane dissolution, and after re-plating of a new palladium membrane, respectively, according to embodiments of the present disclosure.
Figure 14B:
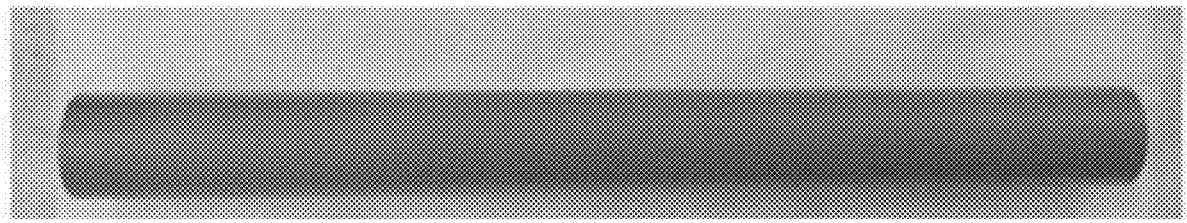
Figure 14C:
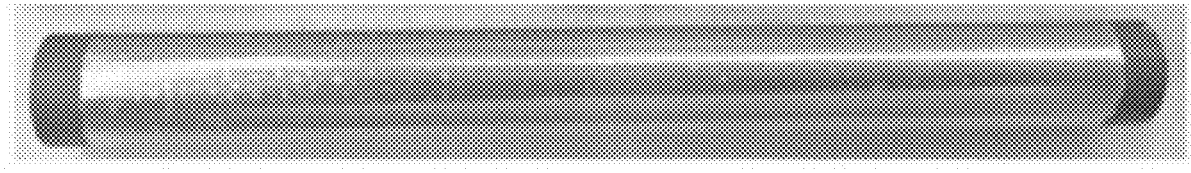

A CMR flow tube impregnated with a ruthenium catalyst and coated with a palladium membrane was submerged in an aqua regia solution (3 molar parts hydrochloric acid, 1 molar part nitric acid). After a few minutes of submersion, visual inspection of the flow tube confirmed that the palladium membrane had been completely dissolved in the aqua regia solution (compare the "shiny" appearance of the exterior surface of the flow tube in FIG. 14A with the "dull" appearance in FIG. 14B). The ceramic support was then thoroughly washed and soaked in deionized water and acetone to remove any residual acid. Gravimetric measurements confirmed that the aqua regia treatment removed substantially all of the palladium membrane, as well as about 5% of the total mass of the ceramic support and/or ruthenium catalyst; as a result, brief ruthenium catalyst impregnation and hydrogen reduction steps as described in Zhang were carried out to regenerate an active catalyst surface to initiate plating. The recycled ceramic support was then re-plated with a new palladium membrane using the procedure described above in Example 7; the re-plated flow tube is illustrated in FIG. 14C.

The performance of the CMR flow tube (hereinafter "CMR A") was assessed both before and after stripping/re-plating of the palladium membrane; results of this assessment are given in Table 1. As Table 1 shows, the performance of the CMR A flow tube was functionally identical, in terms of $N_2$ leak rate and $H_2$ permeance, both before and after the recycling procedure.

TABLE 1

| Measured property | CMR A Pre-recycling | CMR A Post-recycling |
|---|---|---|
| Membrane length (cm) | 7.32 | 7.39 |
| Membrane area (m$^2$) | $2.20 \cdot 10^{-3}$ | $2.20 \cdot 10^{-3}$ |
| Pd membrane thickness (µm) | 4.32 | 4.23 |
| Ru loading (wt %) | 1.02 | 1.97 |
| $N_2$ leak rate (mol m$^{-2}$ s$^{-1}$) at 20° C., 75 psi | $1.74 \cdot 10^{-4}$ | $1.82 \cdot 10^{-4}$ |
| $N_2$ leak rate (mol m$^{-2}$ s$^{-1}$) at 450° C., 75 psi | $<1.33 \cdot 10^{-4}$* | $<1.33 \cdot 10^{-4}$* |
| $H_2$ permeance (mol m$^{-2}$ s$^{-1}$ Pa$^{-0.5}$) at 450° C. | n/a | $1.13 \cdot 10^{-3}$ |

*$N_2$ leak rate at 450° C. was below detection limit; reported value is minimum value of bubble flow meter used to record results (0.5 mL/min)

Example 9

Ammonia Decomposition 0.125" pellets of 0.5% Ru/Al$_2$O$_3$ were crushed and sieved to obtain particles in a size range of 250 to 600 µm. Approximately 5 g of this catalyst was packed into each of the lumen of CMR A, the lumen of another CMR fabricated according to Example 7 (hereinafter "CMR B"), and an ID 316 stainless steel tube with an outer diameter of 0.5" and an inner diameter of 0.43" to form a PBR for comparison purposes. Each of these reactors was used to perform an ammonia decomposition experiment using the experimental setup shown in FIG. S2 of Sitar I. Particularly, each reactor was heated in a Lindberg Blue M furnace, with in situ Omega thermocouples monitoring both the inlet and outlet temperatures; due to the short length of each reactor relative to the size of the furnace's heating zone, isothermal operation was achieved in all three reactors. Each reactor was heated under $N_2$ to 450° C. to prevent $H_2$ embrittlement and then left under $H_2$ flow overnight to reduce the catalyst.

The pure gas permeance of each reactor for $H_2$ and $N_2$ was evaluated before and after the ammonia decomposition test. Ammonia was delivered through the tube side and controlled using a Parker mass flow controller. The retentate pressure was set using a backpressure regulator and the permeate was collected without the use of a sweep gas at ambient pressure (0.834 bar at Golden, Colorado). Permeate and retentate flowrates were measured with Parker mass flow meters calibrated by a Humonics Optiflow 520 bubble flow meter. The gas compositions were analyzed using an Agilent Technologies 6890N gas chromatograph equipped with an HP-PlotU column and/or a nondispersive infrared detector (NDIR) for low levels of ammonia. In each test, the reactor was operated isothermally and isobarically, with care taken to ensure that steady-state was achieved.

The ammonia conversion $X_{NH3}$ and hydrogen recovery $R_{H2}$ were calculated according to the equations given in Example 1, and volumetric hydrogen productivity was calculated according to the following equation:

$$vhp = h_{2,permeate}/R_v$$

where $NH_{3,in}$, $NH_{3,out}$, and $H_{2,permeate}$ are molar quantities of ammonia into the reactor, ammonia out of the reactor, and hydrogen in the permeate stream, respectively; $v_{H2}$ is the hydrogen volumetric flow in the permeate stream measured in standard cubic centimeters per minute (sccm); and Ri is the effective volume of the CMR based on the outer diameter and effective membrane length.

Figure 15:
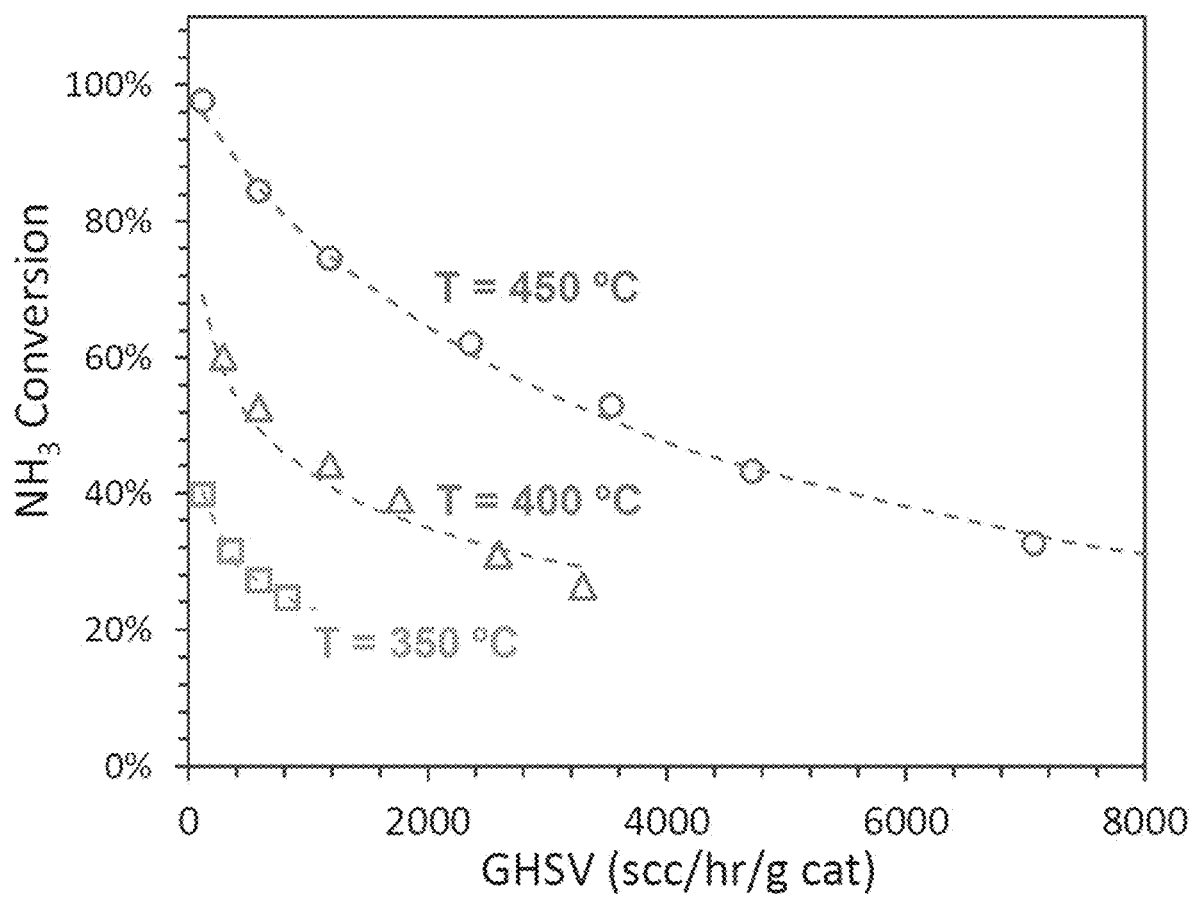
FIG. 15 is a graph of ammonia decomposition in a conventional PBR.
Figure 16A:
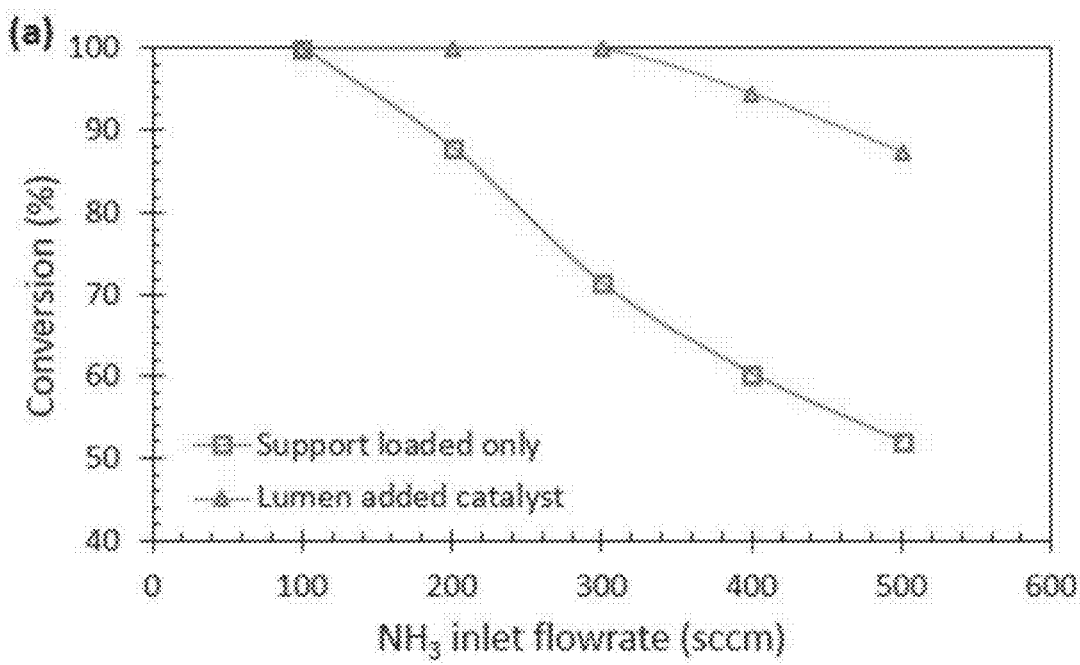
FIGS. 16A, 16B, 16C, and 16D are graphs of ammonia conversion, hydrogen recovery, hydrogen volumetric productivity, and ammonia impurity in the permeate stream, respectively, of a first CMR with and without particulate $Ru/Al_2O_3$ in the lumen thereof at a pressure of 5 barg and a temperature of 450° C., according to embodiments of the present disclosure.
Figure 16B:
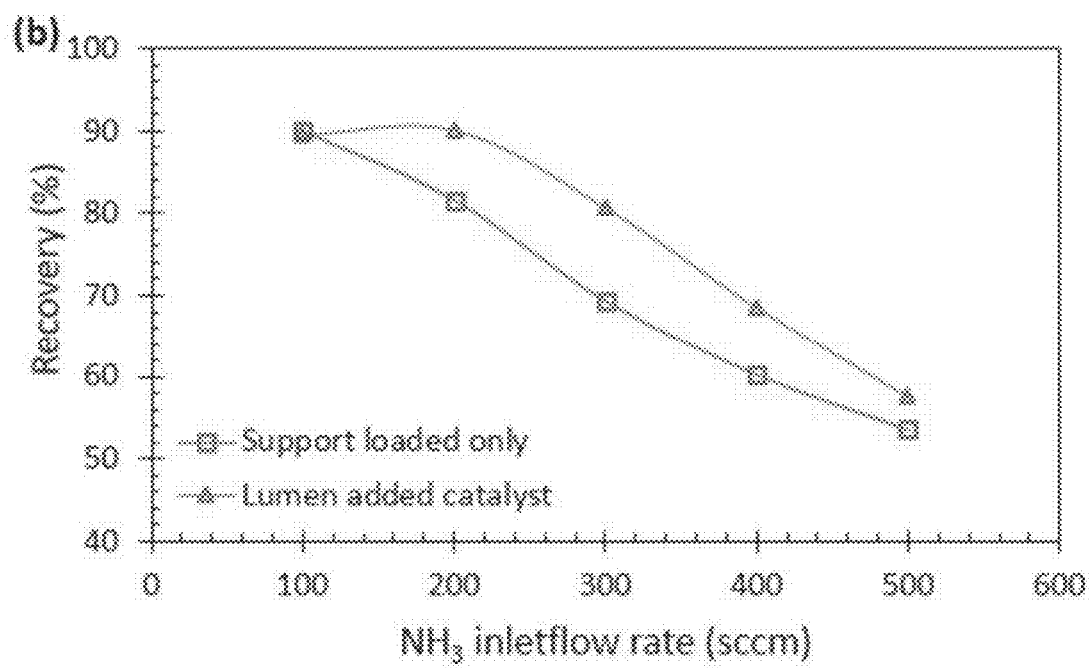
Figure 16C:
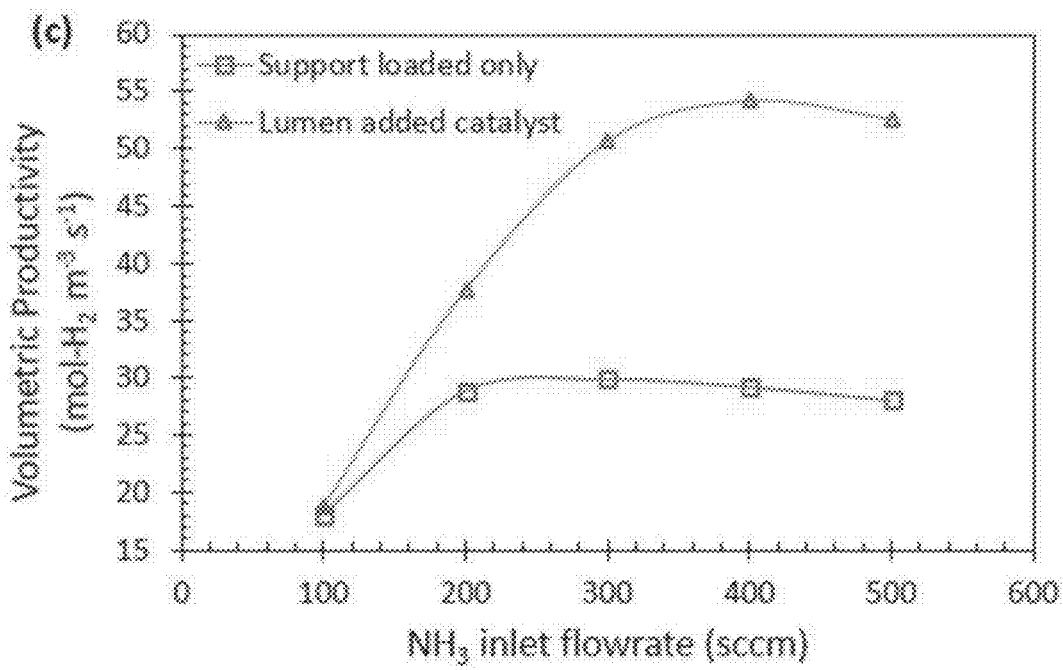
Figure 16D:
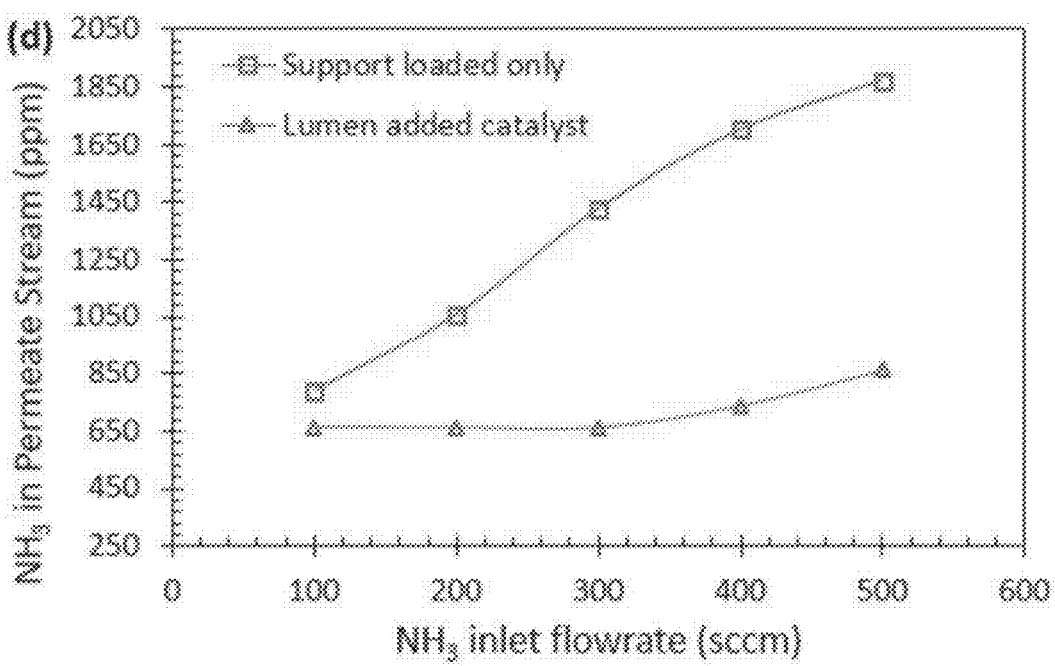

FIG. 15 illustrates the conversion of ammonia to hydrogen in the stainless steel PBR as a function of gas hourly space velocity (GHSV) at a pressure of 5 barg and temperatures of 450° C. (upper curve, circular data points), 400° C. (middle curve, triangular data points), and 350° C. (lower curve, square data points), with the dashed lines representing integral model predictions using the form and parameters of the Temkin-Pyzhev rate equation described in Example 1 above. As FIG. 15 illustrates, hydrogen inhibition prevents complete ammonia conversion, and the impact of this phenomenon increases sharply with decreasing temperature, in a conventional PBR. This result, and the form of the Temkin-Pyzhev equation given above, highlight the advantageous effect of MRs according to the present disclosure over PBRs, as efficient $H_2$ removal accelerates the kinetics of ammonia decomposition and enables lower-temperature operations.

The ammonia decomposition performance of CMR A was evaluated at a temperature of 450° C. and a pressure of 5 barg, both with and without the $Ru/Al_2O_3$ catalyst packed into the lumen (the catalyst was secured at both ends with glass wool); results of these tests are illustrated in FIGS. 16A through 16D. The performance without the particulate catalyst in the lumen is comparable to, but slightly less than, that reported by Zhang, despite having a higher hydrogen permeance due to the reduced membrane thickness. Without wishing to be bound by any particular theory, it is hypothesized that this result is attributable to a decline in catalytic activity, which may be due to the aqua regia treatment and/or a reduction in dispersion of the catalyst due to the impregnation of additional ruthenium catalyst into the ceramic support (CMR A was tested after the recycling procedure of Example 8 was carried out).

The ammonia decomposition performance of CMR A increased dramatically when the particulate $Ru/Al_2O_3$ was added to the lumen. As FIGS. 16A through 16D illustrate, nominally complete conversion of ammonia and greater than 80% recovery of the evolved hydrogen were achieved, even at an ammonia flowrate three times larger than in the empty-lumen test. Accelerating the decomposition of ammonia also increased the hydrogen recovery due to the enhanced driving force. As a result, the hydrogen volumetric productivity increased by more than 45% to a peak of 54.2 mol $H_2$ m$^{-2}$ s$^{-1}$. This enhanced conversion also significantly improved the hydrogen purity in the permeate stream, as the $N_2$ leak rate was unchanged between the two experiments.

Figure 17A:
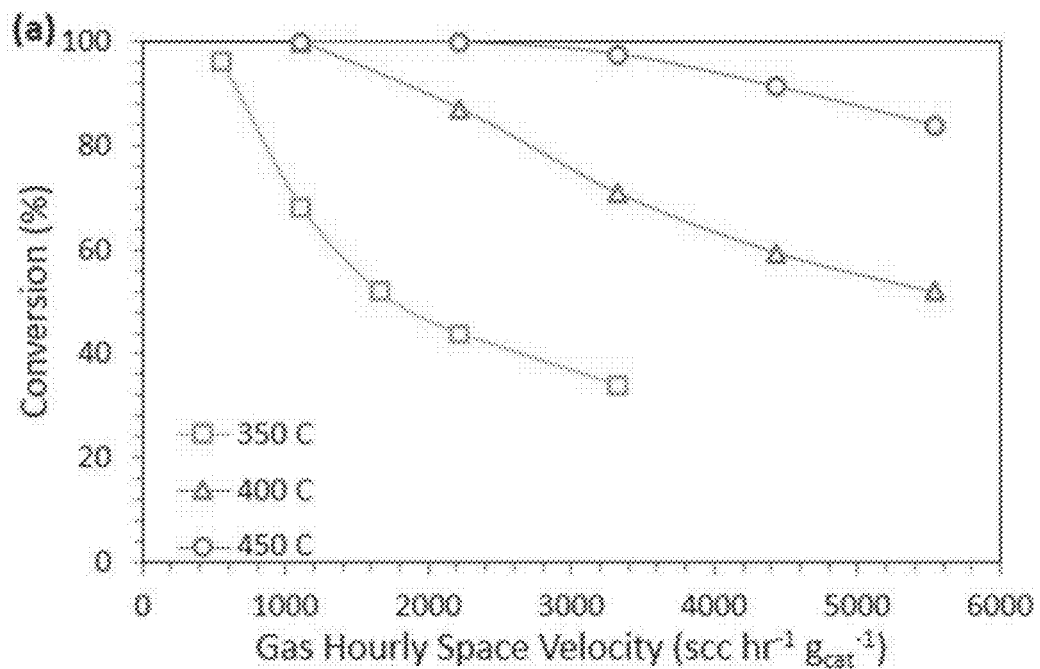
FIGS. 17A, 17B, 17C, and 17D are graphs of ammonia conversion, hydrogen recovery, hydrogen volumetric productivity, and ammonia impurity in the permeate stream, respectively, of a second CMR with particulate $Ru/Al_2O_3$ in the lumen thereof at a pressure of 5 barg and various temperatures, according to embodiments of the present disclosure.

Finally, the ammonia decomposition performance of CMR B as a function of temperature, with $Ru/Al_2O_3$ catalyst placed in the lumen, was evaluated at a pressure of 5 barg and temperatures of 450, 400, and 350° C. to enable direct comparison to the results for the PBR illustrated in FIG. 15; these results are illustrated in FIGS. 17A through 17D. As FIG. 17A illustrates, the conversion increases with temperature and decreases with GHSV; complete conversion was achieved at GHSVs of up to 1127 scc hr$^{-1}$ $g_{cat}^{-1}$ at 400° C., but up to double this value (2255 scc hr$^{-1}$ $g_{cat}^{-1}$) at 450° C. This increase is due to higher activity of the ruthenium catalyst at higher temperatures.

Figure 17B:
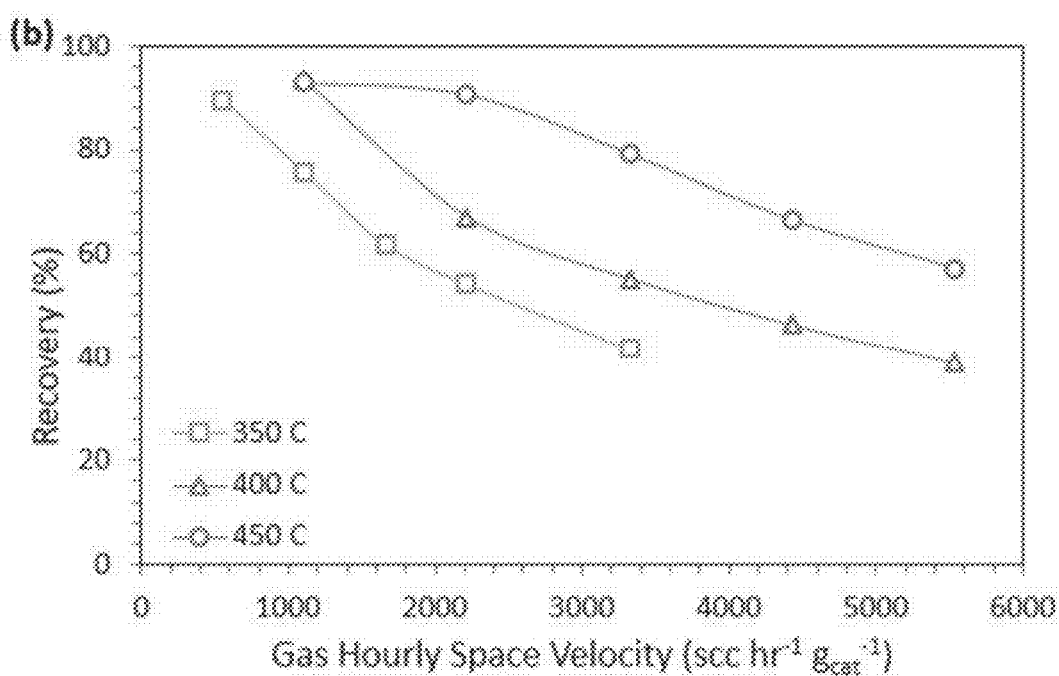

As FIG. 17B illustrates, hydrogen recovery also decreases with GHSV, with recovery values as high as about 90% achievable at a GHSV of 1127 scc hr$^{-1}$ $g_{cat}^{-1}$ at all temperatures. This indicates that the reactor operates in a permeation-limited regime, i.e., the hydrogen production capacity is limited by the membrane permeance; however, as soon as conversion falls below about 99%, the process shifts to a conversion-limited regime, i.e., the hydrogen production capacity is limited by the ability of the catalyst to catalyze the ammonia decomposition reaction. These trends are similar to those observed in Zhang.

Figure 17C:
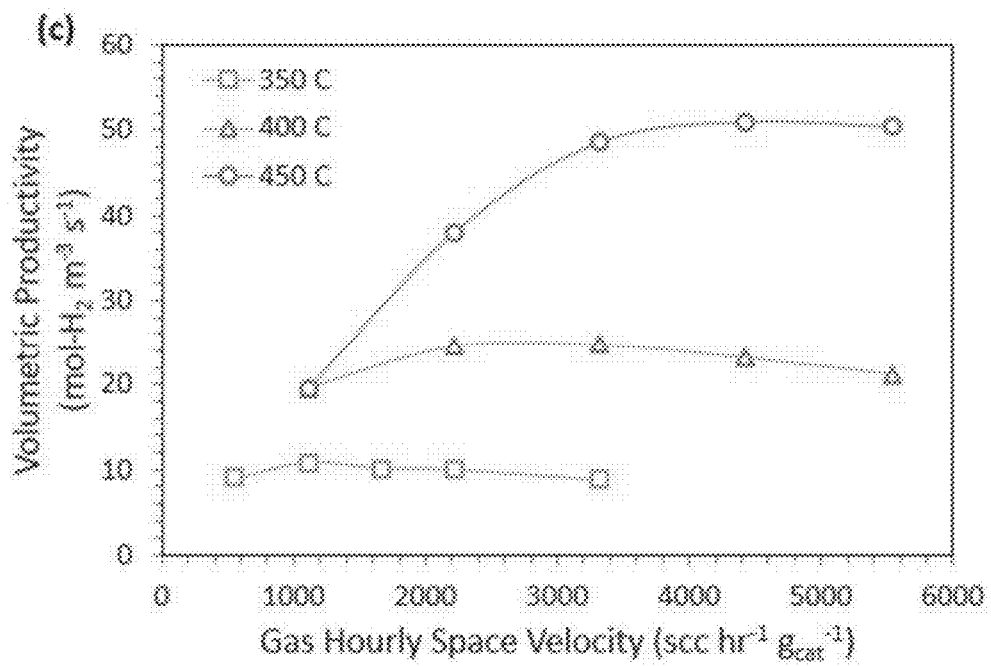

As FIG. 17C illustrates, performance increases with an increase in reaction temperature from 350° C. to 450° C., and the inevitable drop-offs in performance and recovery are extended to higher GHSV values; volumetric productivity reaches an optimum at all temperatures, reflecting the tradeoff between conversion and recovery, and the maximum volumetric productivity shifts to higher GHSV as the temperature increases. The maximum volumetric productivity achieved with CMR B was 51 mol $H_2$ s$^{-1}$ m$^{-3}$, similar to the value of 54 mol $H_2$ s$^{-1}$ m$^{-3}$ observed for CMR A.

Figure 17D:
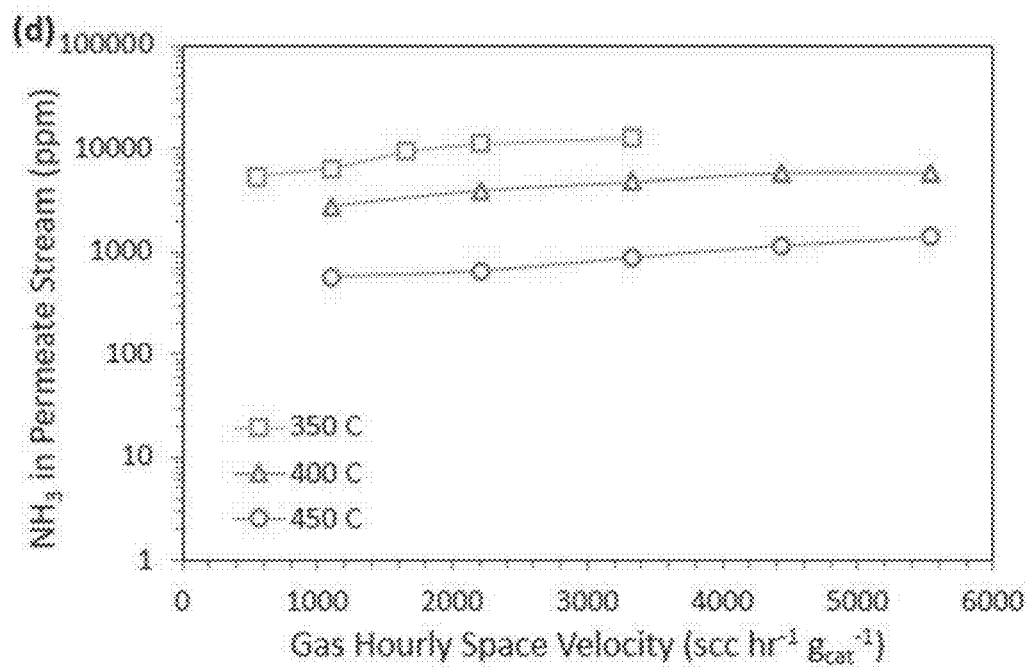
Figure 18A:
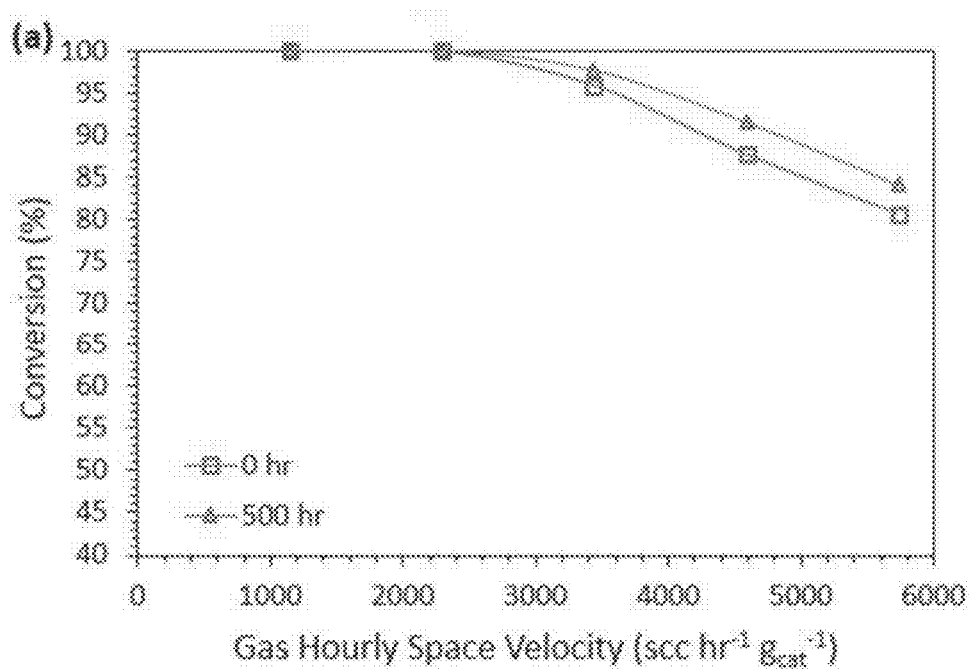
FIGS. 18A, 18B, 18C, and 18D are graphs of ammonia conversion, hydrogen recovery, hydrogen volumetric productivity, and ammonia impurity in the permeate stream, respectively, of the second CMR with particulate $Ru/Al_2O_3$ in the lumen thereof at a pressure of 5 barg and a pressure of 450° C. before and after 500 hours of near-continuous operation, according to embodiments of the present disclosure.
Figure 18B:
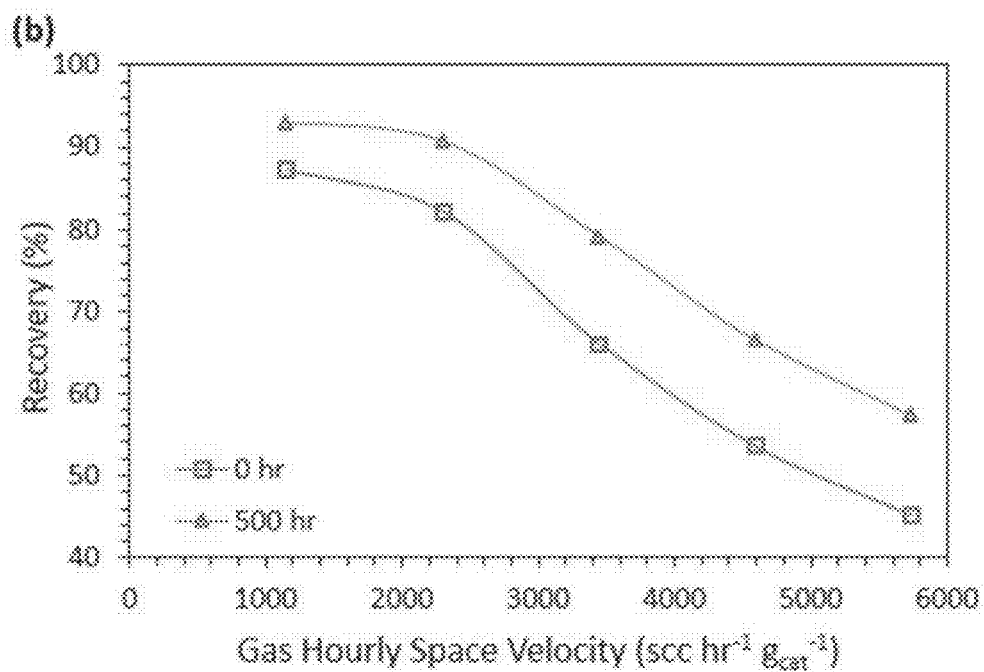
Figure 18C:
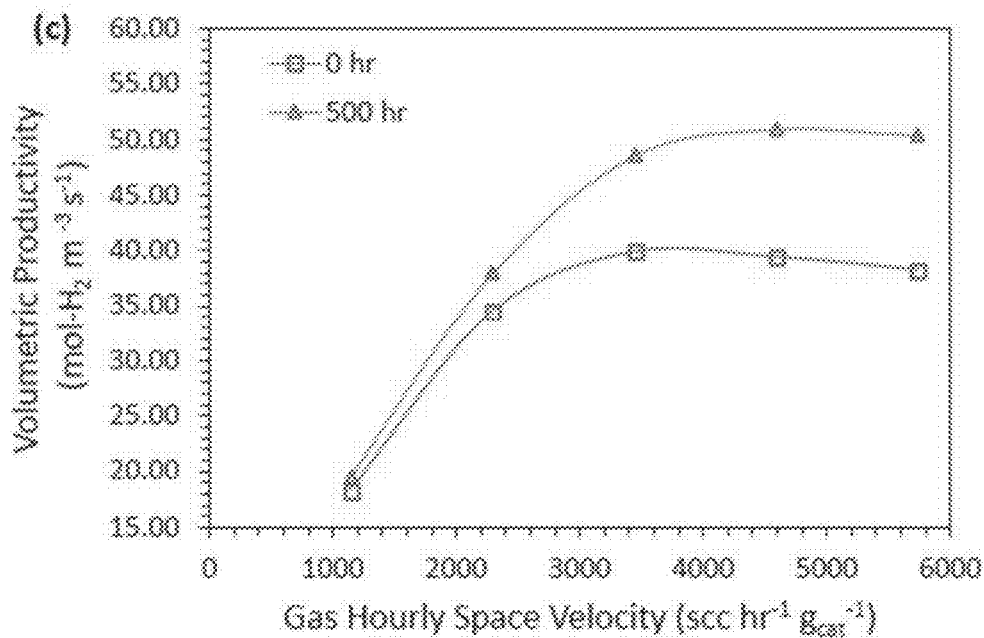
Figure 18D:
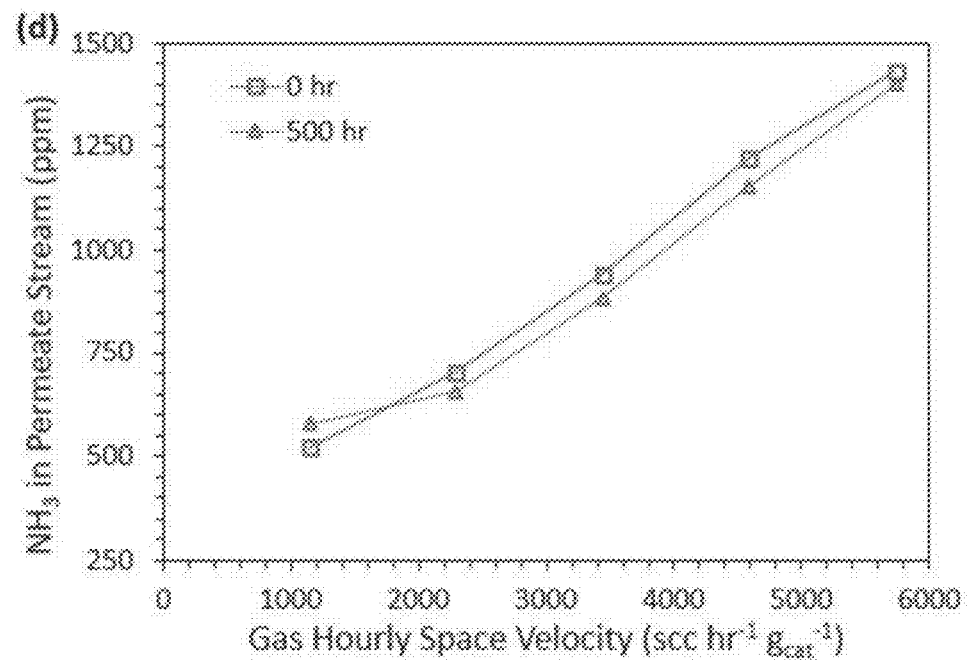

As FIG. 17D illustrates, the level of ammonia impurity in the permeate is relatively insensitive to GHSV but declines exponentially as the temperature is increased. Without wishing to be bound by any particular theory, the present inventors hypothesize that the major cause of this impurity is leakage through the graphite seals used in CMR fabrication, as the bubble test showed no visible defects in the membrane itself. At a temperature of 450° C., the ammonia content of the hydrogen stream was well below 1000 ppm, and can be reduced much further by the use of an ammonia adsorbent, as described in Example 11 and elsewhere throughout this disclosure.

Example 10

Long-Term Stability Evaluation

The durability of CMR B was tested by more than 500 hours of continuous ammonia decomposition operation at 450° C. and 5 barg (with a single complete shutdown after approximately 300 hours). FIGS. 18A through 18D and Table 2 compare the performance of CMR B at a temperature of 450° C. before and after the durability test. At this temperature, catalyst activity is sufficiently high that performance is controlled by permeation, and the $H_2$ permeance of the membrane increased by 27.7% over the course of the test (from 7.83·10$^{-4}$ mol m$^{-2}$ s$^{-1}$ Pa$^{-0.5}$ to 1.0·10$^{-3}$ mol m$^{-2}$ s$^{-1}$ Pa$^{-0.5}$), which, without wishing to be bound by any particular theory, the present inventors hypothesize is attributable to the removal of residual plating impurities in the membrane by the reducing environment of ammonia decomposition. Notably, this improvement was not due to the generation of defects, as the nitrogen permeance was not measurable at 75 psi before or after the durability test and the purity of the permeate was nominally unchanged.

TABLE 2

| Measured property | CMR B Pre-durability test | CMR B Post-durability test |
|---|---|---|
| Membrane length (cm) | 6.79 | 6.79 |
| Membrane area (m$^2$) | $2.15 \cdot 10^{-3}$ | $2.15 \cdot 10^{-3}$ |
| Pd membrane thickness (μm) | 4.03 | 4.03 |
| Ru loading (wt %) | 1.00 | 1.00 |
| N$_2$ leak rate (mol m$^{-2}$ s$^{-1}$) at 20° C., 75 psi | $2.65 \cdot 10^{-4}$ | n/a |
| N$_2$ leak rate (mol m$^{-2}$ s$^{-1}$) at 450° C., 75 psi | $<1.33 \cdot 10^{-4}$* | $<1.33 \cdot 10^{-4}$* |
| H$_2$ permeance (mol m$^{-2}$ s$^{-1}$ Pa$^{-0.5}$) at 450° C. | $7.83 \cdot 10^{-4}$ | $1.0 \cdot 10^{-3}$ |

*N$_2$ leak rate at 450° C. was below detection limit; reported value is minimum value of bubble flow meter used to record results (0.5 mL/min)

Example 11

Adsorption of Ammonia Impurity in Permeate Gas Stream

The commercial ammonia adsorbent products known as Ammo-sorb and KMI Zeolite were obtained from standard sources and analyzed by X-ray diffraction to confirm that these products are the cesium- and sodium-based forms, respectively, of the naturally occurring zeolite material clinoptilolite, with minor oxide impurities. Each of the as-received materials was placed in a cylindrical packed bed with an outer diameter of 6.35 cm and a length of 12.7 cm, and a specialty gas mixture of 10,000 ppm ammonia in N$_2$ gas was flowed through this packed bed at ambient temperature; the outlet composition was measured by a Bacharach NDIR, or by periodically diverting the flow through a Draeger tube to quantify concentrations below the NDIR detection limit of 10 ppm. The ammonia content of the effluent from the adsorber remained below the 10 ppm NDIR detection limit until breakthrough.

The Draeger tube used for quantification of ammonia concentration post-adsorption was filled with a yellow adsorbent that irreversibly turns purple upon ammonia exposure; the length of the purple section of adsorbent within the tube corresponded to the ammonia content of the gas to which the Draeger tube was exposed. Using this technique, effectively no adsorbent was visually observed to turn purple prior to breakthrough, and as a result the ammonia concentration in the permeate gas after treatment in the adsorber was conservatively estimated to be no more than 25 ppb, and almost certainly much lower. This is well below the United States Department of Energy standard of 100 ppb for PEM fuel cell use.

Figure 19:
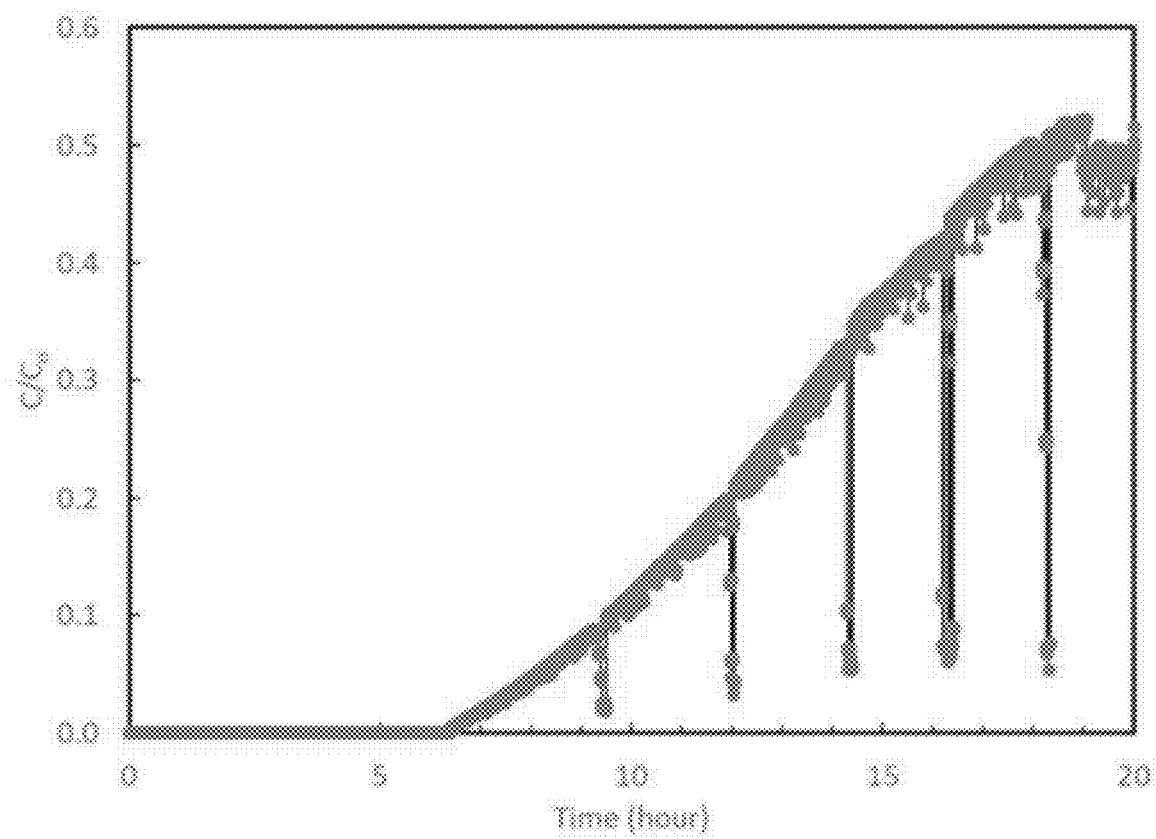
FIG. 19 is a breakthrough curve used to determine the capacity of clinoptilolite adsorbent beds, according to embodiments of the present disclosure.

The ammonia adsorption capacity of each adsorbent product was determined by the amount of ammonia delivered at the point where breakthrough was first observed, as illustrated in FIG. 19; the capacities for the two adsorbent products were similar and were found to be about 0.15±0.05 wt %, consistent with literature reports. Nominally complete restoration of ammonia storage capacity was achieved by heating the adsorption bed under flowing nitrogen to temperatures of about 400° C.

The concepts illustratively disclosed herein suitably may be practiced in the absence of any element which is not specifically disclosed herein. It is apparent to those skilled in the art, however, that many changes, variations, modifications, other uses, and applications of the disclosure are possible, and changes, variations, modifications, other uses, and applications which do not depart from the spirit and scope of the disclosure are deemed to be covered by the disclosure.

The foregoing discussion has been presented for purposes of illustration and description. The foregoing is not intended to limit the disclosure to the form or forms disclosed herein. In the foregoing Detailed Description, for example, various features are grouped together in one or more embodiments for the purpose of streamlining the disclosure. The features of the embodiments may be combined in alternate embodiments other than those discussed above. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment.

Moreover, though the present disclosure has included description of one or more embodiments and certain variations and modifications, other variations, combinations, and modifications are within the scope of the disclosure, e.g., as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, regardless of whether such alternate, interchangeable, and/or equivalent structures, functions, ranges, or steps are disclosed herein, and without intending to publicly dedicate any patentable subject matter.

The invention claimed is:

1. A method for producing a hydrogen-enriched fuel stream, comprising:

introducing a feed stream comprising ammonia into a feed region of a catalytic membrane reactor, wherein the catalytic membrane reactor comprises:

a feed vessel, comprising a feed-facing surface and a permeate-facing surface, wherein the permeate-facing surface is impregnated with a first metal catalyst and coated with a hydrogen-selective membrane;

a permeate vessel;

the feed region, in contact with the feed-facing surface of the feed vessel and containing particles of a second metal catalyst; and a permeate region, in contact with the permeate-facing surface of the feed vessel;

causing at least a portion of the ammonia in the feed stream to undergo a decomposition reaction to form a product gas stream comprising hydrogen gas within the feed region, wherein the decomposition reaction is catalyzed by the first and second metal catalysts;

passing at least a portion of the hydrogen gas in the product gas stream through the hydrogen-selective membrane to form a separated hydrogen gas stream in the permeate region, thereby leaving a remainder of the product gas stream in the feed region as a retentate gas stream;

flowing the retentate gas stream out of an exit of the feed region;

passing a sweep gas comprising a fuel into the permeate region to form the hydrogen-enriched fuel stream; and flowing the hydrogen-enriched fuel stream out of an exit of the permeate region, wherein at least one of the following is true:
  (i) a pressure of the feed stream and a pressure of the sweep gas are approximately equal; and
  (ii) a pressure of the retentate gas stream and a pressure of the hydrogen-enriched fuel stream are approximately equal.

2. The method of claim 1, wherein the at least a portion of the hydrogen gas comprises at least about 98% of the hydrogen gas in the product gas stream.

3. The method of claim 1, wherein an ideal $H_2/N_2$ selectivity of the hydrogen-selective membrane is between about 10 and about 10,000.

4. The method of claim 1, wherein the fuel of the sweep gas is selected from the group consisting of ammonia, natural gas, methane, propane, butane, vaporized hydrocarbons, and combinations thereof.

5. The method of claim 1, wherein a hydrogen content of the hydrogen-enriched fuel stream is from about 1 vol % to about 99 vol %.

6. The method of claim 1, wherein the decomposition reaction is carried out at a temperature of no more than about 450° C.

7. The method of claim 6, wherein the temperature is no more than about 400° C.

8. The method of claim 7, wherein the temperature is no more than about 350° C.

9. The method of claim 1, wherein the temperature is at least about 300° C.

10. The method of claim 1, wherein the decomposition reaction is carried out at atmospheric or superatmospheric pressure.

11. The method of claim 10, wherein the decomposition reaction is carried out at a pressure from about 0 barg to about 50 barg.

12. The method of claim 10, wherein the decomposition reaction is carried out at a pressure of at least about 5 barg.

13. The method of claim 1, wherein at least one of the first and second metal catalysts comprises ruthenium.

14. The method of claim 1, wherein the feed vessel comprises a ceramic support material.

15. The method of claim 14, wherein the ceramic support material comprises yttria-stabilized zirconia.

16. The method of claim 1, wherein the second metal catalyst comprises aluminum (III) oxide ($Al_2O_3$).

17. The method of claim 1, wherein the hydrogen-selective membrane comprises palladium.

18. The method of claim 17, wherein the hydrogen-selective membrane has a thickness of no more than about 5.0 μm.

19. The method of claim 1, wherein the feed-facing surface of the feed vessel is impregnated with the first metal catalyst.

* * * * *